(12) United States Patent
Aida et al.

(10) Patent No.: US 7,887,239 B2
(45) Date of Patent: Feb. 15, 2011

(54) GUIDE TABLE DEVICE

(75) Inventors: Tomoyuki Aida, Tokyo (JP); Kentaro Yamamoto, Tokyo (JP); Katsuya Iida, Tokyo (JP); Hidekazu Michioka, Tokyo (JP)

(73) Assignee: THK Co., Ltd., Tokyo (JP)

( * ) Notice: Subject to any disclaimer, the term of this patent is extended or adjusted under 35 U.S.C. 154(b) by 455 days.

(21) Appl. No.: 12/064,824

(22) PCT Filed: Aug. 28, 2006

(86) PCT No.: PCT/JP2006/316838

§ 371 (c)(1),
(2), (4) Date: Feb. 26, 2008

(87) PCT Pub. No.: WO2007/026632

PCT Pub. Date: Mar. 8, 2007

(65) Prior Publication Data

US 2009/0263054 A1    Oct. 22, 2009

(30) Foreign Application Priority Data

Aug. 31, 2005 (JP) ............................ 2005-252365
Sep. 30, 2005 (JP) ............................ 2005-288699

(51) Int. Cl.
*F16C 29/04* (2006.01)
*B23Q 1/25* (2006.01)
*B23Q 1/48* (2006.01)

(52) U.S. Cl. ............................ 384/42; 384/49; 384/54

(58) Field of Classification Search ............... 384/7, 384/9, 16, 50–51, 54, 42, 45, 49; 248/187.1, 248/425; 33/249.4, 324; 108/94, 137, 140, 108/143; 74/490.09; 269/55

See application file for complete search history.

(56) References Cited

U.S. PATENT DOCUMENTS

| | | | | | |
|---|---|---|---|---|---|
| 1,428,275 | A | * | 9/1922 | Dahl | 108/94 |
| 3,270,423 | A | * | 9/1966 | Birrell et al. | 33/569 |
| 3,860,307 | A | * | 1/1975 | Fostel | 312/249.4 |
| 4,262,974 | A | * | 4/1981 | Tojo et al. | 384/54 |
| 4,993,673 | A | * | 2/1991 | Hirose | 248/176.3 |

(Continued)

FOREIGN PATENT DOCUMENTS

JP        5-18415        1/1993

(Continued)

*Primary Examiner*—Marcus Charles
(74) *Attorney, Agent, or Firm*—Young & Thompson

(57) ABSTRACT

A guide table device is provided with a lower-side plate 10 provided with a pair of rolling member rolling grooves 11 formed in a first (X) direction, an upper-side plate 30 provided with a pair of rolling member rolling grooves 31 formed in a second (Y) direction, an intermediate member 20 having rectangular configuration provided with four side portions to which four rolling member rolling grooves 21 are formed so as to be opposed to a pair of rolling member rolling grooves of the lower-side plate and a pair of rolling member rolling grooves of the upper-side plate, and a plurality of balls 40 disposed to be rollable between four rolling member rolling passages formed by the lower-side plate, the upper-side plate and the intermediate member. The four rolling member rolling grooves 21 formed to the four side portions of the intermediate member 20 are formed on the same plane.

20 Claims, 15 Drawing Sheets

U.S. PATENT DOCUMENTS

| | | | | |
|---|---|---|---|---|
| 5,031,547 | A | * | 7/1991 | Hirose .................. 248/425 |
| 5,363,774 | A | | 11/1994 | Anada et al. |
| 5,760,500 | A | | 6/1998 | Kondo et al. |
| 6,640,452 | B1 | * | 11/2003 | Bieg ........................ 33/503 |
| 6,722,289 | B2 | * | 4/2004 | Kato ......................... 108/20 |
| 7,240,580 | B2 | * | 7/2007 | Everman ............. 74/490.09 |

FOREIGN PATENT DOCUMENTS

| | | |
|---|---|---|
| JP | 5-67433 A | 9/1993 |
| JP | 9-243766 A | 9/1997 |
| JP | 9-266660 A | 10/1997 |
| JP | 11-280761 | 10/1999 |

* cited by examiner

GUIDE TABLE DEVICE

BACKGROUND OF THE INVENTION

1. Field of the Invention

The present invention relates to a guide table device, and particularly, to an improvement of the guide table device capable of realizing compact and light-weight structure while maintaining high rigidity and high guiding performance.

2. Background Art

In a conventional technology, there is known so-called a build-up type guide table device utilizing a linear guide as a device freely moving a work table of a machine tool or like in X- and Y-directions which are perpendicular to each other. In such guide table device, a track rail is disposed, along the X-direction, on a base such as bed or column, a lower-side table is disposed to be movable along the track rail, a further track rail is disposed on the lower-side table to be movable along the Y-direction, and an upper-side table is also disposed to be movable along the further track rail. Accordingly, in such guide table device, the upper-side table is freely movable in the X- and Y-directions with respect to the base (for example, refer to Patent Publication 1).

Further, Patent Publication 2 shows another guide table device intended to provide a compact and light-weight structure by press-working a thin steel plate. In such guide table device, lower-side plate and upper-side plate are formed in shape of channel by bending both end portions of the steel plates through press-working, and an intermediate portion is also formed by bending downward opposing two sides of surrounding four sides and bending upward remaining opposing two sides in a manner such that the bent opposing side wall portions constitute the upper-side plate, the lower-side plate and the intermediate portion, and a plurality of balls are disposed between the mutually opposing side wall portions, the balls rolling along the side wall portions, so that the intermediate portion is moved in the X-direction with respect to the lower-side plate, and the upper-side plate is moved in the Y-direction with respect to the intermediate portion.

Furthermore, Patent Publication 3 discloses a guide table device which is capable of being moved in a rotating direction (θ) as well as horizontal direction (X- and Y-directions). The guide table device shown in Patent Publication 3 realizes the movement in the X-, Y- and θ-directions in combination of a cross-perpendicular guide and a bearing.

Patent Publication 1: Japanese Patent laid-open Publication No. HEI 11-280761

Patent Publication 2: Japanese Patent laid-open Publication No. HEI 5-18415

Patent Publication 3: Japanese Patent laid-open Publication No. HEI 9-243766

However, in the guide table device disclosed in the above Patent Publication 1, the Y-directional track rail is disposed on the lower-side table movable in the X-direction, and accordingly, the lower-side table requires itself a high rigidity, and in addition, a height from a stationary portion to the upper-side table becomes long, thus providing a problem of large size and heavy-weight structure.

The guide table device disclosed in the above Patent Publication 2 realizes a compact and light-weight structure. However, in this guide table device, the lower-side plate, the intermediate portion and the upper-side plate are formed of thin steel plate through press-working, and accordingly, if the press-working is carried out with less performance, a gap will be formed between the ball and a ball rolling groove, which results in a saccadic movements of the intermediate portion to the lower-side plate and of the upper-side plate to the intermediate portion, and hence, the upper-side plate cannot be moved at high performance with respect to the lower-side plate, thus being inconvenient.

With the guide table device of the Patent Publication 2 mentioned above, the gap between the ball and the ball rolling groove may be eliminated by selecting balls each having a slightly larger diameter and imparting a preload to the ball rolling on the ball rolling groove, and the generation of the saccadic movement of the upper-side plate with respect to the lower-side plate may be prevented. However, in such device, since ball rolling groove is formed by the side wall portions bent by the press working, when the large-diameter balls are selected, the ball contacts the ball rolling groove and the side wall portions of the respective plates are hence deformed before the compression. Accordingly, a sufficient preload is not applied to the balls, being also inconvenient.

Because of the reasons mentioned above, in the guide table device of the Patent Publication 2, it is required to improve the working performance in the press-working and increasing rigidity of the steel plate forming the respective plates. However, these requirements decrease a merit in the press-working, i.e., good productivity or low cost, and increase manufacturing cost of the guide table device.

With the guide table device which carries out the guide only in the X- and Y-directions, some disadvantages or inconveniences mentioned above are provided, and in a case of additionally performing the guiding in the θ-direction, it is inevitable to further increase the size and weight of the device. For example, in the guide table device disclosed in the above Patent Publication 3, a shaft member is disposed above three cross-perpendicular guides, and a table is provided via a bearing mounted to this shaft member. Accordingly, the guide table device of the Patent Publication 3 has a large size in both the vertical and horizontal directions for accommodating structural members, thus increasing the manufacturing cost.

BRIEF SUMMARY OF THE INVENTION

The present invention was conceived in consideration of the above circumstances and an object thereof is to provide a new guide table device capable of making compact and reducing weight while maintaining high rigidity and high performance.

The guide table device of the present invention includes:

a lower-side plate provided with a pair of rolling member rolling grooves formed in a first direction;

an upper-side plate provided with a pair of rolling member rolling grooves formed in a second direction;

an intermediate member having a rectangular configuration having four side portions in which four rolling member rolling grooves are respectively formed so as to oppose to the paired rolling member rolling grooves formed to the lower-side plate and the paired rolling member rolling grooves formed to the upper-side plate, respectively; and a plurality of balls arranged in four rolling member rolling passages respectively formed by the lower-side plate, the upper-side plate and the intermediate member, wherein the rolling member rolling grooves formed to the four side portions of the intermediate member are formed on a same plane.

The other guide table device of the present invention includes:

a lower-side plate provided with a skirt portions standing up from opposing two side portions of a rectangular flat surface portion of the lower-side plate to be fixed to a base, the skirt portions having opposing inside surfaces in which rolling member rolling grooves are respectively formed;

an upper-side plate provided with a skirt portions extending downward from opposing two side portions in a perpendicular direction with respect to two side portions to which the skirt portions of the lower-side plate are formed, the skirt portions having opposing inside surfaces in which rolling member rolling grooves are respectively formed;

an intermediate member having a rectangular configuration having four side portions in which four rolling member rolling grooves are respectively formed so as to oppose to the paired rolling member rolling grooves formed to the lower-side plate and the paired rolling member rolling grooves formed to the upper-side plate, respectively; and a plurality of balls arranged in four rolling member rolling passages respectively formed by the lower-side plate, the upper-side plate and the intermediate member, wherein the rolling member rolling grooves formed to the four side portions of the intermediate member are formed on a same plane.

In the guide table device mentioned above, the lower-side plate and the upper-side plate may have substantially same shape and size.

Further, in the guide table device mentioned above, a plurality of balls may be arranged between the four rolling member rolling passages through a cage.

Further, in the guide table device of the present invention, it may be desired that the lower-side plate and the upper-side plate are each formed with at least one access hole formed to a plate flat surface portion and one screw hole formed to a plate flat surface portion, and the intermediate member has a bored structure forming an opening at a central portion of a rectangular surface portion, and wherein a fastening member is screw-engaged with the screw hole formed to the upper-side plate through the access hole formed to the lower-side plate as viewed from the lower-side plate side, and a fastening member is screw-engaged with the screw hole formed to the lower-side plate through the access hole formed to the upper-side plate as viewed from the upper-side plate side.

Furthermore, in the guide table device of the present invention, the lower-side plate and the upper-side plate may be respectively provided with rolling member control members for controlling rolling motion of the rolling member at stroke end portions of the rolling member rolling grooves formed to the lower-side plate and the upper-side plate.

Furthermore, in the guide table device mentioned above, the rolling member control member may include a spring pin insertion hole formed to a stroke end portion of the rolling member rolling groove formed to each of the lower-side plate and the upper-side plate, and a spring pin disposed to be inserted into the spring pin insertion hole.

Furthermore, in the guide table device of the present invention, it may be preferred that the lower-side plate and the upper side plate have a relationship of $\alpha<\beta$, in which $\alpha$ is a length of a side to which the rolling member rolling groove is formed and $\beta$ is a length of a side to which the rolling member rolling groove is not formed.

Still furthermore, the guide table device of the present invention includes:

a first plate provided with a pair of rolling member rolling grooves formed in the linear direction;

a second plate provided with a pair of rolling member rolling grooves each having a curvature, the paired rolling member rolling grooves being disposed with opposing curved recessed portions;

an intermediate member having substantially an oval configuration having four side portions in which four rolling member rolling grooves are formed so as to oppose to the paired rolling member rolling grooves formed to the first plate and the paired rolling member rolling grooves formed to the second plate with equal spaces, respectively; and a plurality of rolling members disposed to be rollable in four rolling member rolling passages formed by the first plate, the second plate and the intermediate member.

Further, in the guide table device mentioned above, it may be desired that the first plate is provided with a pair of linear skirt portions formed to two linear side portions opposing to a plate flat surface portion of the first plate fixed to a base or an object to be guided and a the rolling member rolling grooves formed in the inside surfaces opposing to the linear skirt portions, and the second plate is provided with a pair of curved skirt portions formed to two side portions having curvature opposing to an oval-shaped plate flat surface portions of the second plate fixed to the object to be guided or the base, and the rolling member rolling grooves are formed to the inside surfaces opposing to the curved skirt portions, respectively.

Furthermore, in the guide table device of the present invention, the plural rolling members may be disposed between the four rolling member rolling passages through a cage.

Furthermore, in the guide table device of the present invention, it may be desired that the first plate and the second plate are each formed with at least one access hole formed to a plate flat surface portion and one screw hole formed to a plate flat surface portion, and the intermediate member has a bored structure forming an opening at an oval-shaped central portion of the surface portion, and wherein a fastening member is screw-engaged with the screw hole formed to the second plate through the access hole formed to the first plate as viewed from the first plate side, and a fastening member is screw-engaged with the screw hole formed to the first plate through the access hole formed to the second plate as viewed from the second plate side.

Furthermore, in the guide table device mentioned above, the first plate and the second plate may be respectively provided with rolling member control members for controlling rolling motion of the rolling member at stroke end portions of the rolling member rolling grooves formed to the first plate and the second plate.

Furthermore, in the guide table device mentioned above, the rolling member control member may include a spring pin insertion hole formed to a stroke end portion of the rolling member rolling groove formed to each of the first plate and the second plate, and a spring pin disposed to be inserted into the spring pin insertion hole.

Still furthermore, in the guide table device of the present invention the first plate and the second plate may have a relationship of $\alpha<\beta$, in which $\alpha$ is a length of a side to which the rolling member rolling groove is formed and $\beta$ is a length of a side to which the rolling member rolling groove is not formed.

Furthermore, in the guide table device of the present invention, the four rolling member rolling grooves formed in the four side portions of the intermediate member may be disposed on a same plane.

Still furthermore, the guide table device of the present invention includes:

a lower-side plate provided with a pair of rolling member rolling grooves extending in a first direction;

an upper-side plate provided with a pair of rolling member rolling grooves extending in a second direction;

an intermediate member having a rectangular configuration provided with four rolling member rolling grooves formed to four side portions of the intermediate member disposed so as to be opposed to a pair of rolling member rolling grooves of the lower-side plate and a pair of rolling member rolling grooves of the upper-side plate, respectively; and a plurality of rolling members disposed to be rollable in four rolling member rolling passages formed by the lower-side plate, the upper-side plate and the intermediate member, wherein the lower-side plate is provided with lower side skirt portions standing up from opposing two side portions of a rectangular flat surface portion of the lower-side plate to be fixed to a base, the skirt portions having opposing inside surfaces in which rolling member rolling grooves are respectively formed; the upper-side plate is provided with skirt portions extending downward from opposing two side portions in a perpendicular direction with respect to two side portions to which the skirt portions of the lower-side plate are formed, the skirt portions having opposing inside surfaces in which rolling member rolling grooves are respectively formed; the intermediate member has four rolling member rolling grooves formed to the four side portions on a same plane, and an opening is bored at a rectangular central portion thereof; and the opening has at least a circular-arc portion so that the guide table device is entirely rotationally movable with a central point of the circular-arc shape being a center of rotation.

Further, in the guide table device mentioned above, the opening may have a round shape and a rotational bearing or cross roller bearing is disposed in the circular opening so that the guide table device is entirely rotationally movable.

It is further to be noted that the subjects of the present invention mentioned above do not include all the essential features of the present invention, and sub-combinations of the above subject features will also constitute the present invention.

According to the present invention, it is possible to provide a new guide table device capable of realizing compact and light-weight structure while maintaining high rigidity and high guiding performance.

REFERENCE NUMERALS

10—lower-side plate, 10a—flat surface portion of lower-side plate, 10b—skirt portion, 11—rolling member rolling groove, 12—screw hole, 13—access hole, 15—spring pin insertion hole, 16—spring pin, 20—intermediate member, 21—rolling member rolling groove, 22—opening, 30—upper-side plate, 30a—flat surface portion of upper-side plate, 30b—skirt portion, 31—rolling member rolling groove, 32—screw hole, 33—access hole, 35—spring pin insertion hole, 36—spring pin, 40—ball, 41—cage, 50, 52—bolt, 50a, 52a—bolt head, 60—rolling member control means, 110—first plate, 110a—flat surface portion of first plate, 110b—linear skirt portion, 111—rolling member rolling groove, 112—screw hole, 113—access hole, 115—spring pin insertion hole, 116—spring pin, 120—intermediate member, 121 (121a, 121b)—rolling member rolling groove, 122—opening, 130—second plate, 130a—flat surface portion of second plate, 130b—curved skirt portion, 131—rolling member rolling groove, 132—screw hole, 133—access hole, 135—spring pin insertion hole, 136—spring pin, 140—ball, 141—cage, 150, 152—bolt, 150a, 152sa—bolt head, 160—rolling member control means, 210—lower-side plate, 210a—flat surface portion of lower-side plate, 210b—lower-side skirt portion, 211—rolling member rolling groove, 212—screw hole, 213—access hole, 215—spring pin insertion hole, 216—spring pin, 220—intermediate member, 221—rolling member rolling groove, 222a—opening for rotation, 222b—opening for access, 230—upper-side plate, 230a—flat surface portion of upper-side plate, 230b—upper-side skirt portion, 231—rolling member rolling groove, 232—screw hole, 233—access hole, 235—spring pin insertion hole, 236—spring pin, 240—ball, 241—cage, 250, 252—bolt, 250a, 252a—bolt head, 260—rolling member control means, 270—bearing.

DETAILED DESCRIPTION OF THE INVENTION

Hereunder, preferred embodiments for embodying the present invention will be described with reference to the accompanying drawings. Further, it is to be noted that the following embodiments do not limit the inventions of the respective patent claims, and all of the combinations of the subject features mentioned in the embodiments is not always essential to the solution of the invention.

First Embodiment

Guide Table Device Capable of Being Guided in X- and Y-Directions

Figure 1:
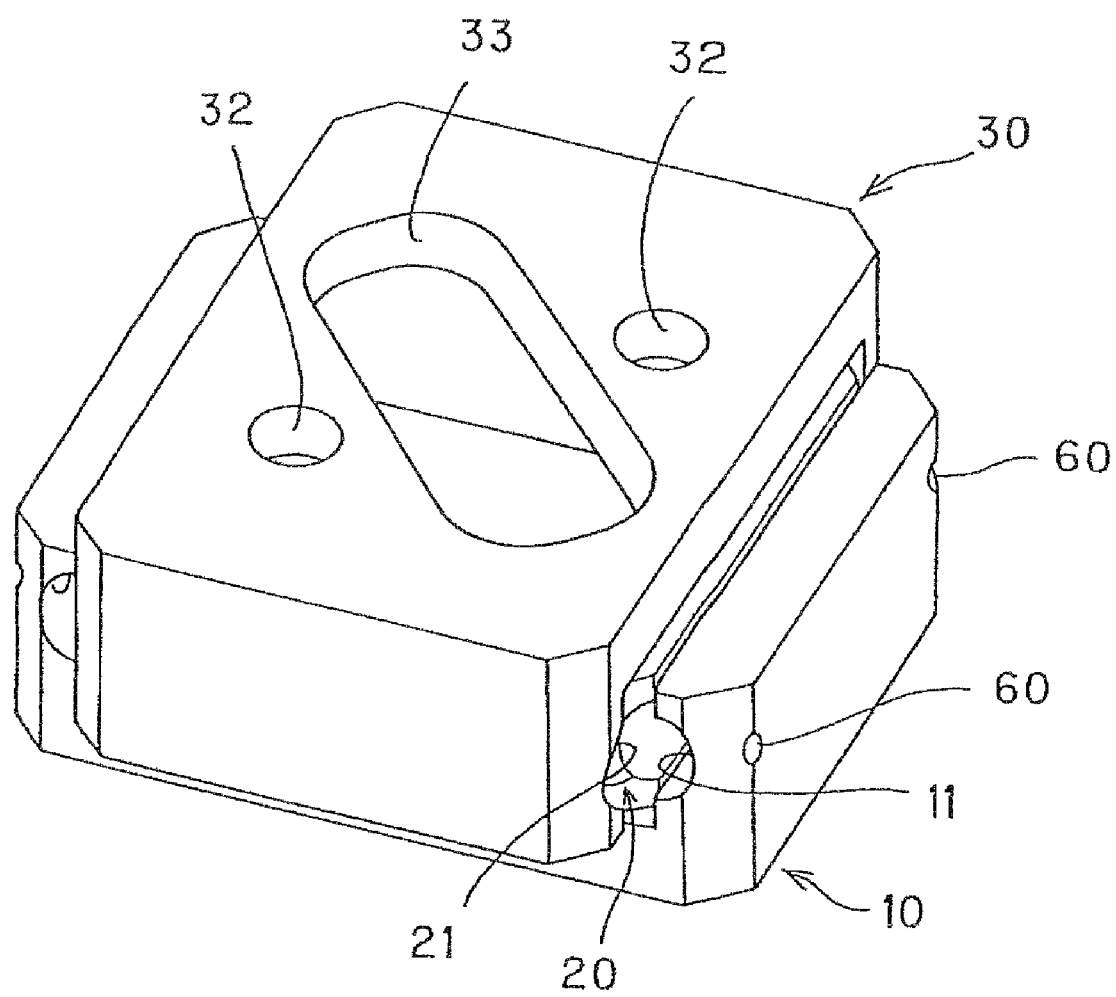
FIG. 1 is a perspective view showing an entire configuration of a guide table device according to a first embodiment of the present invention.
Figure 2:
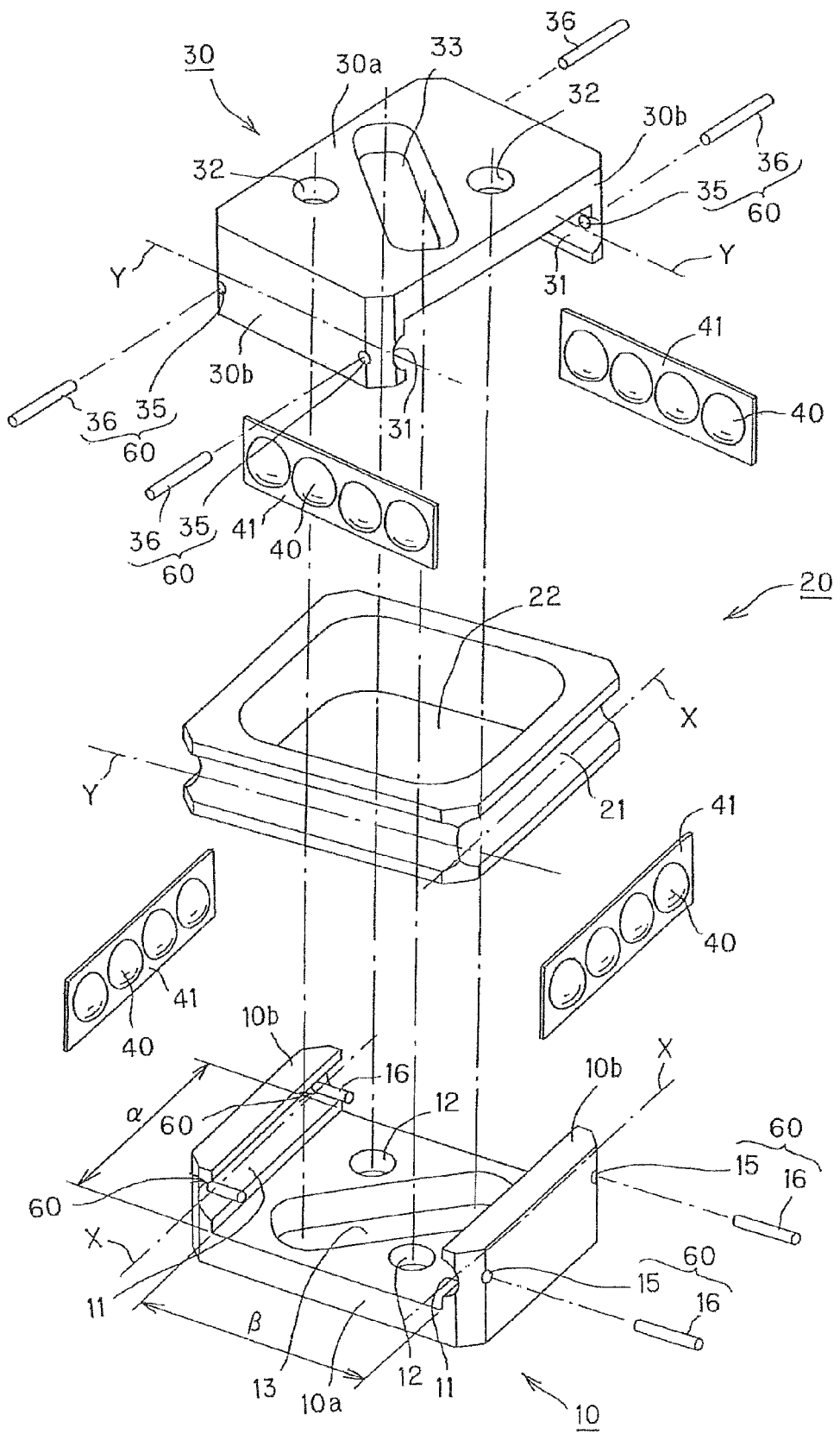
FIG. 2 is a developed perspective view of the guide table device of the first embodiment for showing structural members thereof.

FIG. 1 is a perspective view showing entire outer appearance of a guide table device according to the first embodiment of the present invention. FIG. 2 is a developed perspective view for explaining structural members of the guide table device of the first embodiment. The guide table device according to the first embodiment includes a lower-side plate 10, an intermediate member 20, an upper-side plate 30 and a plurality of balls 40 as essential elements.

The lower-side plate 10 is a member provided with a pair of rolling member rolling grooves 11 formed to the first direction (direction designated by character "X", which is called hereafter X-direction). The lower-side plate 10 includes a rectangular flat surface portion 10a and a pair of skirt portions 10b standing upward from two side end portions extending in the X-direction of opposed two pairs of side end portions. The flat surface portion 10a of the lower-side plate 10 is a member capable of being secured to a base such as bed or column as a positioning standard, and provided with screw holes 12 for securing. The paired skirt portions 10b are members provided with rolling member rolling grooves 11 formed to the opposing inside surfaces so as to receive rolling load of a plurality of balls 40 mentioned hereinlater.

The upper-side plate 30 is a member formed so as to have the same shape and size as those of the lower-side plate 10 and is used in a state of the lower-side plate being upside-down. That is, the upper-side plate 30 is a member provided with a pair of rolling member rolling grooves 31 formed in the second direction (i.e. direction shown by "Y", called Y-direction hereafter), and the specific structure thereof includes an upper-side plate flat surface portion 30a having a rectangular shape to which an object to be guided is fixed and two side portions opposing to this upper-side plate flat surface portion 30a, these two side portions constituting a pair of skirt portions 30b extending downward from two sides extending in the perpendicular direction with respect to the two sides to which the skirt portions 10b of the lower-side plate 10 are formed. Further, the rolling member rolling grooves 31 are also formed in the opposing inside surfaces of the paired skirt portions 30b so as to receive rolling load of the balls 40 as mentioned hereinafter. The fixing between the upper-side plate 30 and the object to be guided is performed by utilizing screw holes 32 formed to the flat surface portion 30a of the upper-side plate 30.

The intermediate member 20 is a member disposed so as to be sandwiched between the lower-side plate 10 and the upper-side plate 30. This intermediate member 20 has a rectangular outer appearance and is formed with rolling member rolling grooves 21 in four side portions constituting an outer peripheral portion thereof. Two rolling member rolling grooves 21 formed in the X-direction in these four rolling member rolling grooves 21 are disposed so as to oppose to the paired rolling member rolling grooves 11 formed to the lower-side plate 10, and on the other hand, two rolling grooves formed in the Y-direction in these four rolling member rolling grooves 21 are disposed so as to oppose to the paired rolling member rolling grooves 31 formed to the upper-side plate 30.

A pair of rolling member rolling passages extending in the X-direction are formed by the two rolling member rolling grooves 21 formed in the X-direction and the paired rolling member rolling grooves 11 formed to the lower-side plate 10. On the other hand, a pair of rolling member rolling passages extending in the Y-direction are formed by the two rolling member rolling grooves 21 formed in the Y-direction and the paired rolling member rolling grooves 31 formed to the upper-side plate 30. The balls 40 are freely rolling along these four rolling member rolling passages. These balls 40 are disposed between the four rolling member rolling passages via a cage 41, and by disposing the cage 41, the aligned rolling motion of the balls 40 can be always maintained.

In the above description, the basic structure of the guide table device according to the first embodiment of the present invention was explained, and in addition, as characteristic feature of the guide table device of this first embodiment, it will be pointed out that the four rolling member rolling grooves 21 provided for the four side portions of the intermediate member 20 are formed on the same plane. That is, in a conventional guide table device, the rolling member rolling grooves in the X-direction and those in the Y-direction are formed to the intermediate member on the different planes, so that in the conventional intermediate member, load in the guiding direction is not uniformly applied, and in addition, it was required for the intermediate member to have a thickness twice the width of the rolling member rolling groove. However, according to the intermediate member 20 of the first embodiment, since all the rolling member rolling grooves 21 are formed on the same plane, the load is applied uniformly, and it is satisfied for the intermediate member 20 to have a thickness equal to the width of the rolling member rolling groove, thus making compact the entire structure of the device.

Figure 3A:
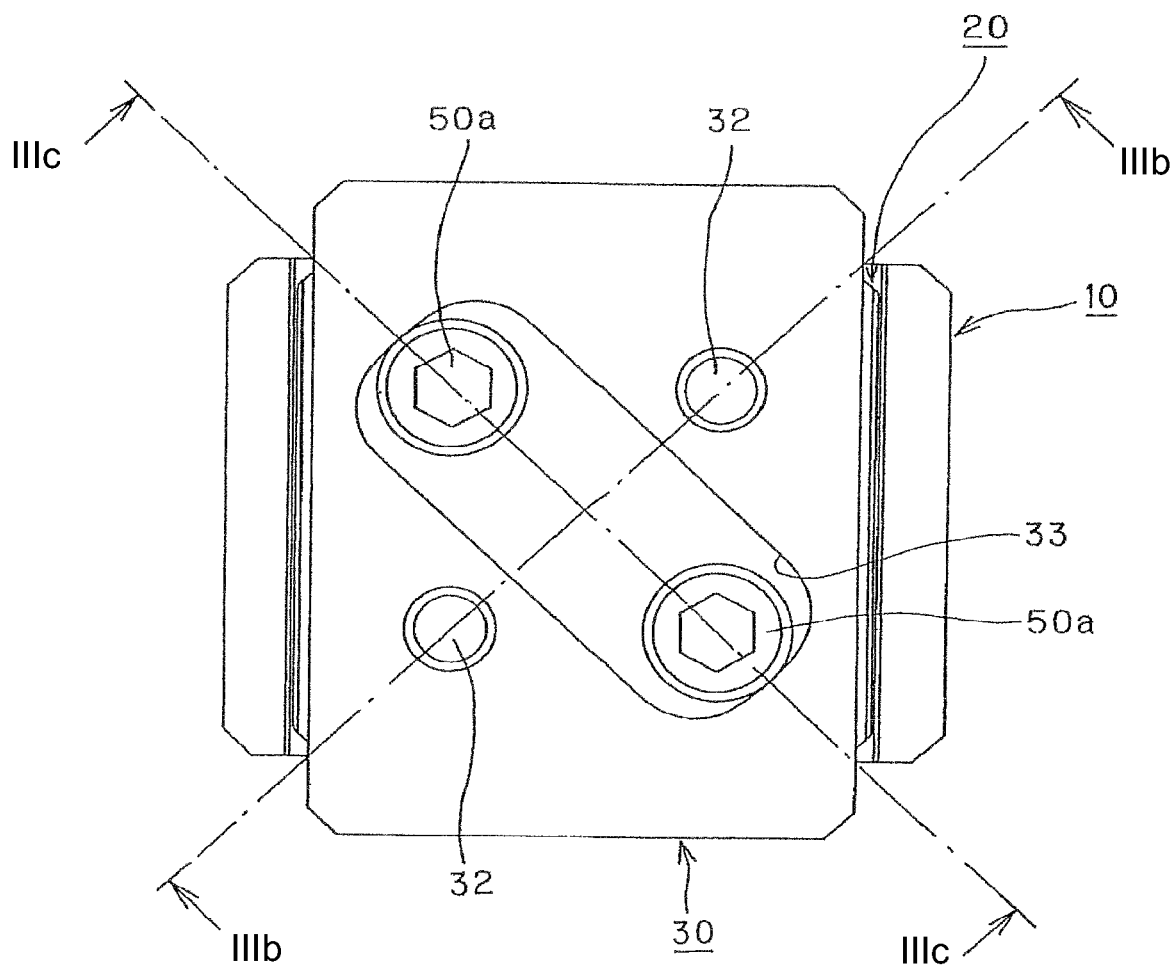
FIG. 3A is a plan view showing an upper outside portion of the guide table device of the first embodiment.
Figure 3B:
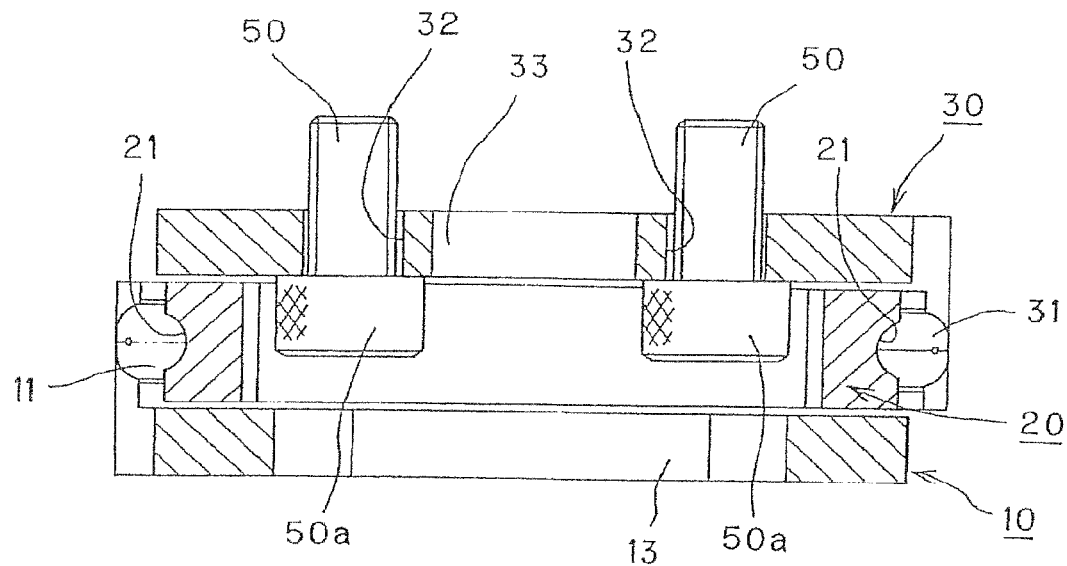
FIG. 3B shows an elevational side section taken along the line IIIb-IIIb in FIG. 3A.
Figure 3C:
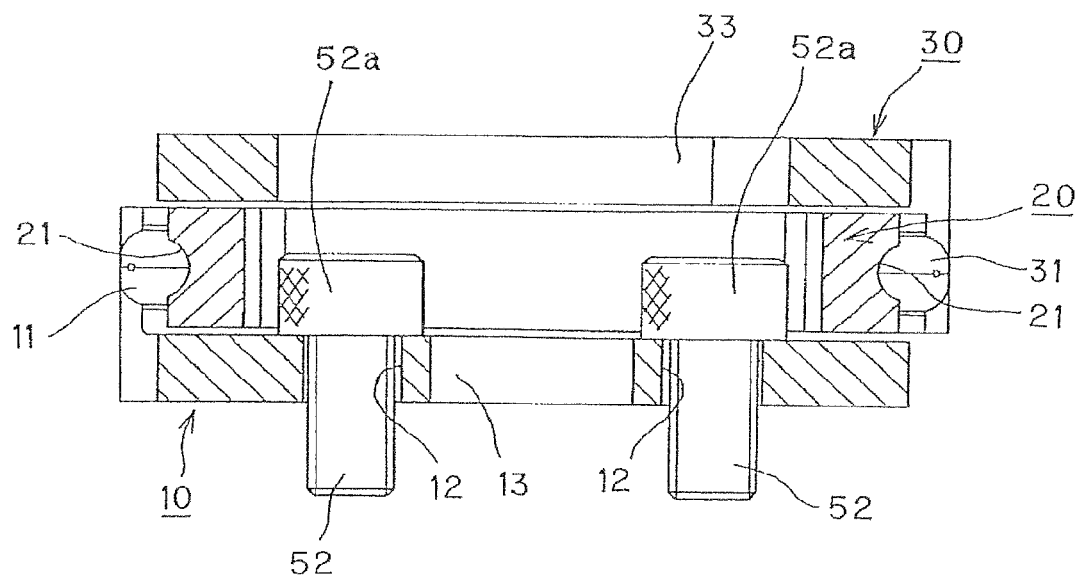
FIG. 3C shows an elevational side section taken along the line IIIc-IIIc in FIG. 3A.

Furthermore, the guide table device according to the first embodiment is provided with a further characteristic feature relating to a mounting structure to the base and the object to be guided. Such characteristic feature will be explained hereunder with reference to FIGS. 3A, 3B and 3C. Herein, FIG. 3A is an upper side view of an outer appearance of the device viewed from the upper side thereof, FIG. 3B is an elevational sectional side view of the IIIb-IIIb section in FIG. 3A, and FIG. 3C is an elevational sectional side view of the IIIc-IIIc section in FIG. 3A.

That is, as shown in FIG. 1 to FIG. 3C, access holes 13 and 33 are formed to the lower-side plate 10 and the upper side plate 30, respectively, of the first embodiment in the diagonal direction of the flat surface portions 10a and 30a, respectively. In addition, the screw hole 12 to be screw-engaged with the base, not shown, and the screw hole 32 to be screw-engaged with the object to be guided, not shown, are formed on the diagonal line crossing perpendicularly to directions forming the access holes 13 and 33 on both sides thereof. The access hole 13 formed to the lower-side plate 10 and the access hole 33 formed to the upper-side plate 30 are arranged in directions crossing at right angles in the assembled state of the lower-side plate 10 and the upper-side plate 30.

Furthermore, the intermediate member 20 sandwiched in position between the lower-side plate 10 and the upper side plate 30 is formed so as to provide a bored structure having a rectangular opening 22 at the central portion thereof. That is, in the guide table device according to the first embodiment, the screw hole 12 on the side of the lower-side plate 10 can be observed through the access hole 33 of the upper-side plate 30, so that the mounting of the device to the base, not shown, can be realized by inserting a tool such as driver through the access hole 33 of the upper-side plate side and screwing a fastening member such as bolt 50 to the screw hole 12 of the lower-side plate 10.

On the contrary, the screw hole 32 on the side of the upper-side plate 30 can be observed through the access hole 13 of the lower-side plate 10, so that the mounting of the object to be guided, not shown, can be realized by inserting a tool such as driver through the access hole 13 of the lower-side plate side and screwing a fastening member such as bolt 52 to the screw hole 32 of the upper-side plate 30.

Further, the access holes 13 and 33 may have various shapes, other than slot shape shown in FIGS. 1 to 3C, such as round-hole shape, elliptical-hole shape, or like, as far as they take such positional relationship as that the access hole 13 is overlapped with the screw hole 32 and the access hole 33 is overlapped with the screw hole 12, respectively, in the perpendicular direction at the time of completing the assembling working of the guide table device.

Furthermore, a head 50a of the bolt 50 screwed with the screw hole 12 of the lower-side plate side and a head 52a of the bolt screwed with the screw hole 32 of the upper-side plate side, respectively, abut against an inside wall surface of the opening 22 formed to the intermediate member 20 to thereby achieve the effect of prescribing the stroke ranges in the X- and Y-directions. That is, the heads 50a and 52a of the bolts 50 and 52 can achieve function as mechanical stopper. In addition, by optionally changing the relationship between the heads 50a, 52a and the opening 22, the stroke ranges in the X- and Y-directions can be optionally prescribed, and the movements, more than necessary, of the lower-side plate 10 and the upper-side plate 30 with respect to the intermediate member 20 can be prevented. Furthermore, this structure may contribute to the elimination of a member limiting the stroke ranges in the X- and Y-directions, and accordingly, the reduction of the structural member will contribute to the reduction of the manufacturing cost.

Figure 4:
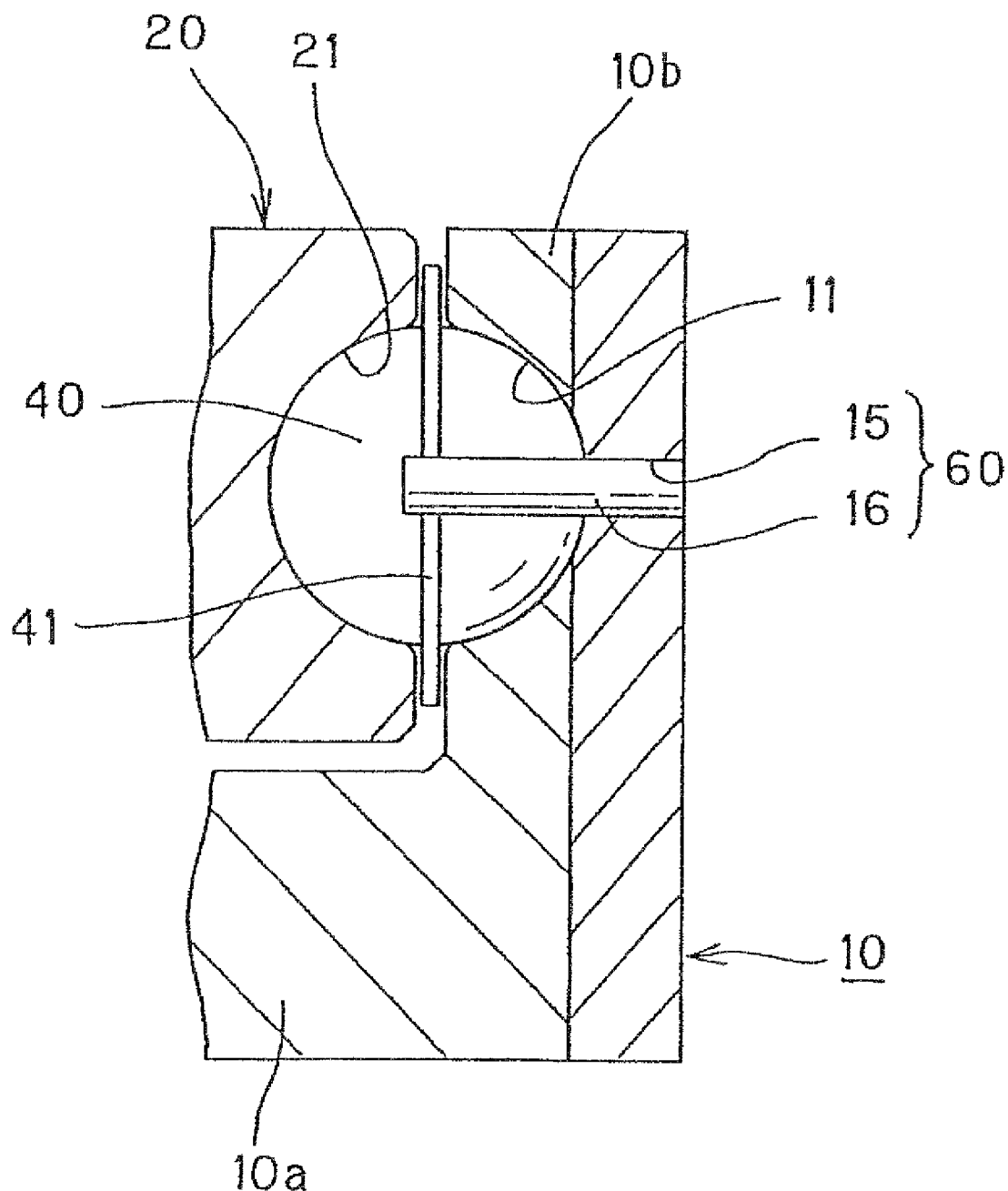
FIG. 4 is an enlarged sectional view of an essential portion for explaining a rolling member control means according to the first embodiment.

Still furthermore, it is possible for the lower-side plate 10 and the upper-side plate 30 to be provided with rolling member control means 60 to the stroke ends of the rolling member rolling grooves of these plates for controlling the rolling motion of the ball. FIG. 4 is an enlarged view for explaining the rolling member control means 60 according to the first embodiment. Such rolling member control means 60 are respectively composed of spring pin insertion holes 15 and 35 formed to the stroke end portions of the rolling member rolling grooves 11 and 31 formed to the lower-side plate 10 and the upper-side plate 30 and spring pins 16 and 36 to be inserted into the spring pin insertion holes 15 and 35, respectively. A plurality of balls 40 maintained their aligned state by being arranged in the cage 41 may be shifted and moved on one side in the rolling member rolling passage by the repeated rolling motions in the X- and Y-directions. In such occasion, if any control means for controlling the motion of the balls 40 are not located at the stroke end portions of the rolling member rolling grooves 11 and 31, there is a fear of shifting the balls on the end side of the rolling member rolling passage, and in an adverse case, the balls 40 may come off from the rolling member rolling passage and there may cause a case that any smooth rolling motion cannot be achieved. Then, the movement of the cage 41 is limited by the spring pins 16 and 36 disposed so as to project over the rolling member rolling grooves 11 and 31 to thereby limit the range of the rolling motion of the balls 40 within the predetermined range.

Further, for the rolling motion control means 60 according to the first embodiment, from the view point of advantage of not receiving high load and requiring performance of a counter-side hole, the structure of the spring pins 16, 36 and the spring insertion holes 15, 35 is adopted. However, as to the rolling member control means, any type of means may be adopted as far as it controls the movement of the cage 41.

Furthermore, with respect to the stroke range of the guide table device according to the first embodiment, the stroke range will be prescribed by a structure satisfying a relationship of $\alpha < \beta$ supposing that $\alpha$ is a length of the side of the lower-side plate 10 or the upper-side plate 30 to which the rolling member rolling groove 11 or 31 is formed, and $\beta$ is a length of the side thereof to which no rolling member rolling groove is formed (see FIG. 2). That is, a difference between values of $\alpha$ and $\beta$ corresponds to the stroke distance in the X- and Y-directions, and by changing this difference value, a guide table device having a desired stroke range can be designed.

Hereinabove, although the preferred embodiment of the present invention was mentioned, the technical scope of the present invention is not limited to the described range. The above-mentioned embodiment may be variously changed and modified. For example, in the described first embodiment, the guide table device incorporated with the balls 40 was explained, but a structure in which rollers are utilized in place of the balls 40 may be adopted. Furthermore, as the intermediate member 20 having rectangular outer appearance, the square intermediate member 20 was explained with reference to the drawings of the first embodiment, but a rectangular shape or rhombic shape may be adopted. That is, the term "rectangular" mentioned in these papers is defined so as to include the square shape, rectangular shape and rhombic shape. It may be clear from the description of the appended claims that an embodiment including such modification or change is included in the technical scope of the present invention.

Second Embodiment

Guide Table Device Capable of being Guided in X- and θ-Direction

Figure 5:
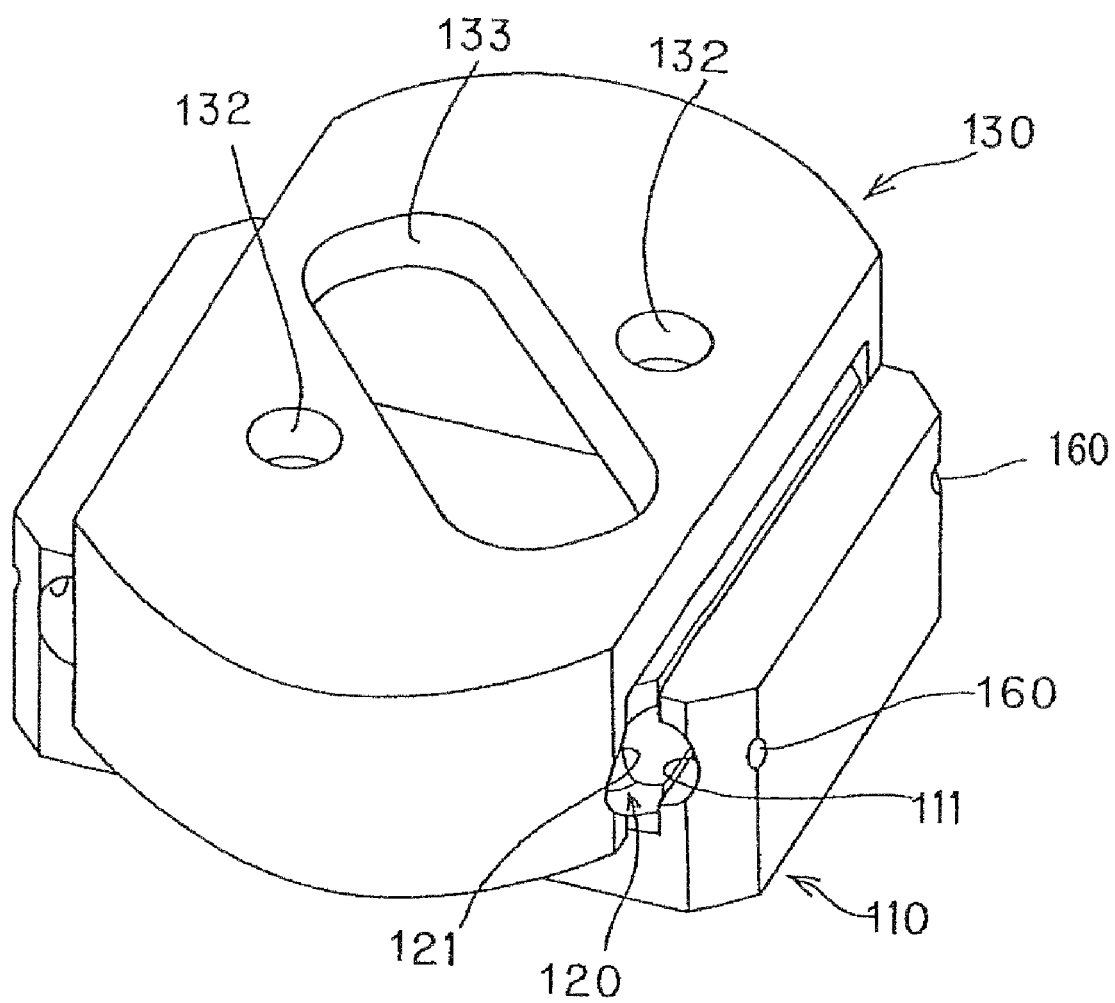
FIG. 5 is a perspective view showing an entire configuration of a guide table device according to a second embodiment of the present invention.
Figure 6:
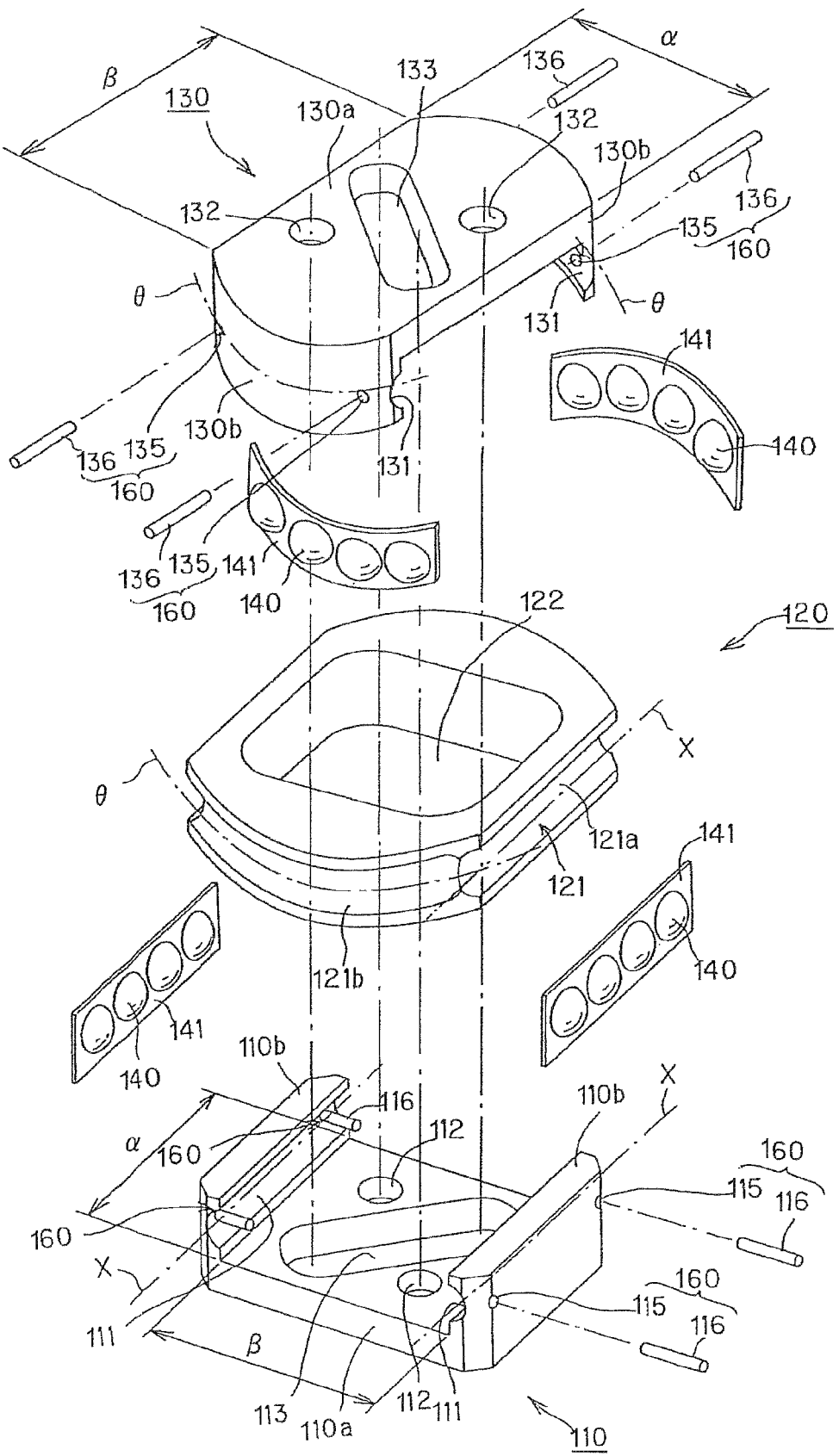
FIG. 6 is a developed perspective view of the guide table device of the second embodiment for showing structural members thereof.

FIG. 5 is a perspective view showing an entire outer appearance of a guide table device according to the second embodiment. FIG. 6 is a developed perspective view for explaining structural members of the guide table device according to the second embodiment. The guide table device according to the second embodiment includes, as main structural members, a first plate 110, an intermediate member 120, a second plate 130 and a plurality of balls 140.

The first plate 110 is a member provided with a pair of rolling member rolling grooves 111 formed to a linear direction (direction designated by character "X", which is called hereafter X-direction). The first plate 110 includes a first flat surface portion 110a and a pair of skirt portions 110b standing upward from two side end portions extending in the X-direction of opposed two pairs of side end portions of the first plate flat surface portions 110a. The first flat surface portion 110a is a member capable of being secured to a base such as bed or column as a positioning standard, or a member to be secured to an object to be guided, and provided with screw holes 112 for securing. The paired skirt portions 110b are members provided with the rolling member rolling grooves 111 formed to the opposing inside surfaces thereof so as to receive rolling load of a plurality of balls 40 mentioned hereinlater.

The second plate 130 is a member provided with a pair of rolling member rolling grooves 131 having a curvature formed in a rolling direction (designated by "θ", called θ-direction hereafter) and the specific structure thereof includes an approximately oval-shaped second plate flat surface portion 130a to which the object to be guided or base is fixed and a pair of curved skirt portions 130b provided for opposing two side portions of the second flat surface portion 130a. The paired skirt portions 130b are provided with curved rolling member rolling grooves 131 at the inside surfaces thereof, respectively, so that the protruded sides of the paired curved rolling member rolling grooves 131 are opposed to each other so as to receive the rolling load of the plurality of balls 140 mentioned hereinafter. Further, the fixing between the second plate 130 and the object to be guided or base is achieved by using a screw hole 132 formed to the second flat surface portion 130a.

The intermediate member 120 is a member disposed so as to be sandwiched between the first plate 110 and the second plate 130. This intermediate member 20 has an approximately oval shape in an outer appearance and is formed with rolling member rolling grooves 121 in four side portions constituting an outer peripheral portion thereof. Two rolling member rolling grooves 121a formed in the X-direction in these four rolling member rolling grooves 121 are disposed so as to oppose to the paired rolling member rolling grooves 111 formed to the first plate 110, and on the other hand, two curved rolling grooves 121b formed in the θ-direction in these four rolling member rolling grooves 121 are disposed so as to oppose to the paired rolling member rolling grooves 131 formed to the second plate 130.

A pair of rolling member rolling passages extending in the X-direction are composed of two rolling member rolling grooves 121a and a pair of rolling member rolling grooves 111 formed to the first plate 110 both extending in the X-direction. Furthermore, a pair of rolling member rolling passages extending in curved-shape in the θ-direction are composed of two curved rolling member rolling grooves 121b and a pair of rolling member rolling grooves 131 formed to the second plate 130 both extending in the θ-direction. A number of balls 140 are disposed between these four rolling member rolling passages to be rollable. These balls 140 are disposed between these four rolling member rolling passages through the cage 141, and according to this location of the cage 141, the aligned rolling motion of the balls 140 can be always maintained.

In the above disclosure, although the basic structure of the guide table device according to the second embodiment was explained, further characteristic feature of the guide table device of this second embodiment will be mentioned. Namely, first, the four rolling member rolling grooves 121 formed to the four side portions of the intermediate member 120 lie on the same plane. That is, in a conventional guide table device, the rolling member rolling grooves formed to the intermediate member lie on the different planes in the X-direction and θ-direction, and accordingly, in the conventional intermediate member, a load in the guiding direction is not uniformly applied, and in addition, the intermediate member requires a thickness more than two times of the width of the rolling member rolling groove. However, according to the intermediate member 120 of this second embodiment, since the rolling member rolling grooves 121 are all formed in the same plane, a load to be applied can be made uniform with the thickness substantially equal to the width of the rolling member rolling groove, thus making compact the guide table device itself.

Figure 7A:
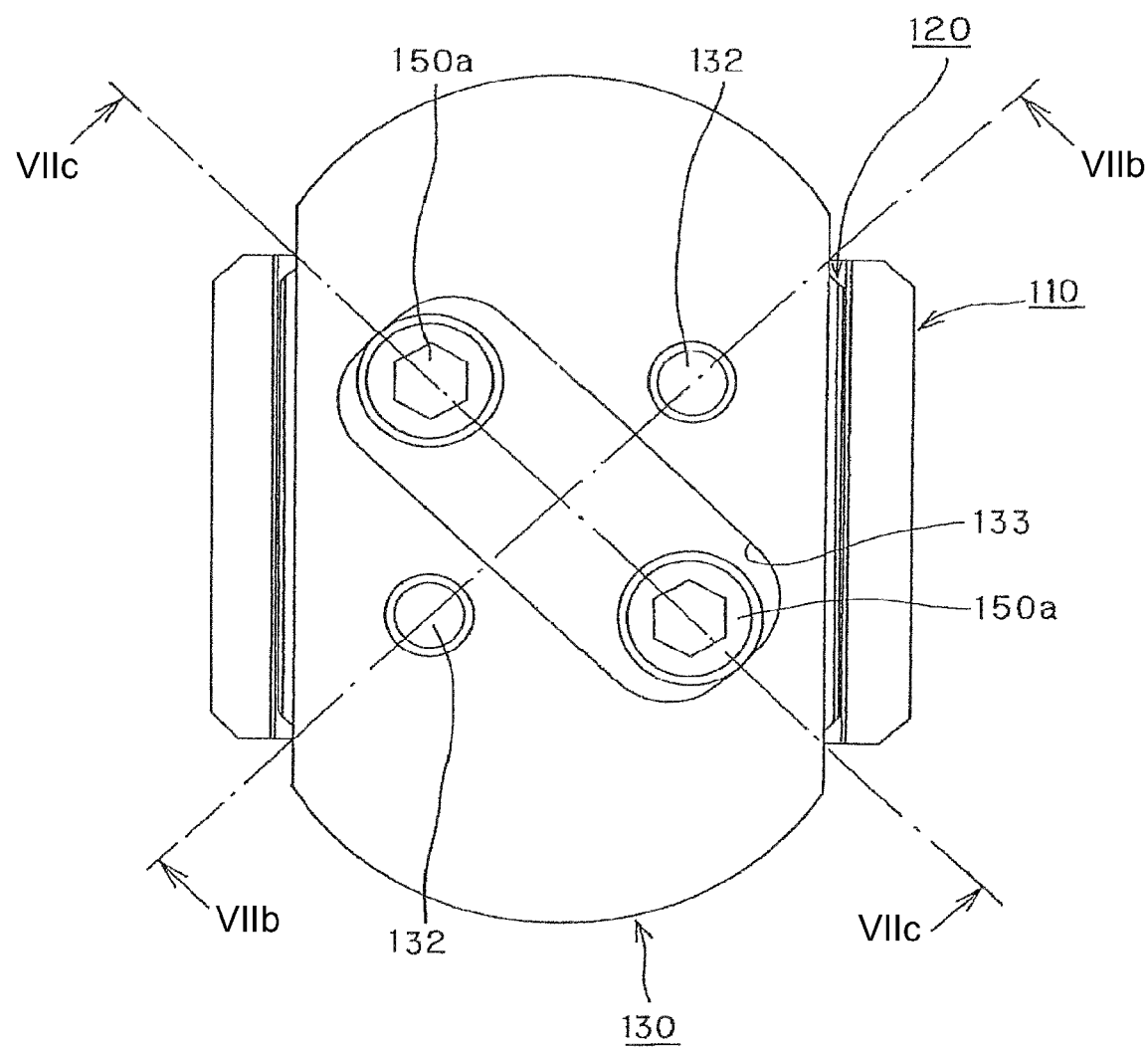
FIG. 7A is a plan view showing an upper outside portion of the guide table device of the second embodiment.
Figure 7B:
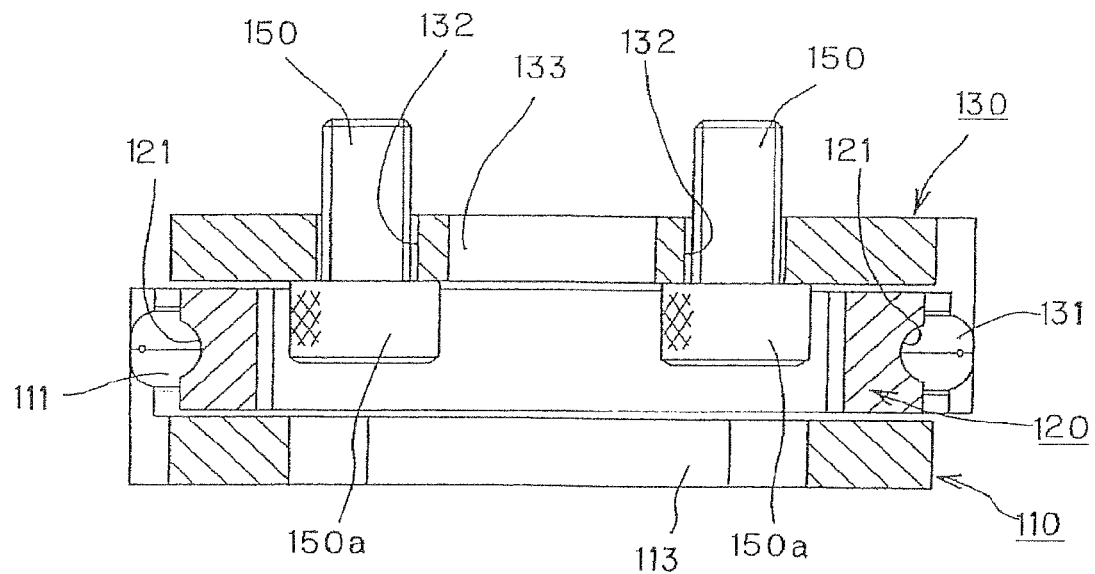
FIG. 7B shows an elevational side section taken along the line VIIb-VIIb in FIG. 7A.
Figure 7C:
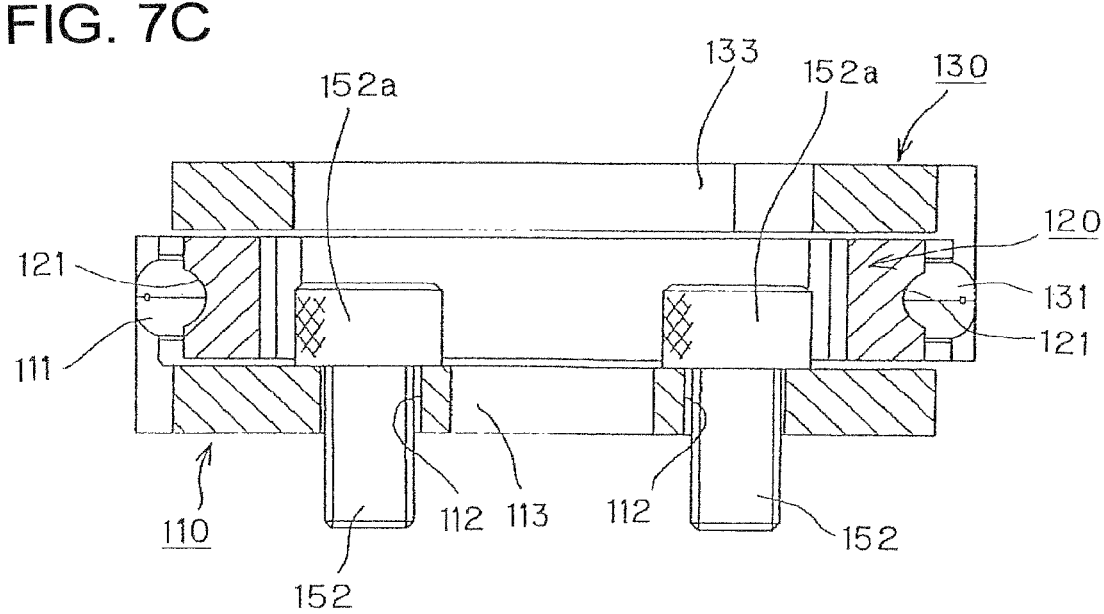
FIG. 7C shows an elevational side section taken along the line VIIc-VIIc in FIG. 7A.

Furthermore, the guide table device according to the second embodiment further includes a characteristic feature with respect to the mounting structure of the base and the object to be guided, which will be explained with reference to FIGS. 7A, 7B and 7C, in which FIG. 7A is a plan view, as viewed from the upper side, showing an upper outside portion of the guide table device of the second embodiment, FIG. 7B shows an elevational side section taken along the line VIIb-VIIb in FIG. 7A, and FIG. 7C shows an elevational side section taken along the line VIIc-VIIc in FIG. 7A.

That is, as shown in FIG. 5 to FIG. 7C, the first plate 110 and the second plate are formed respectively with one access holes 113 and 133 formed in the diagonal lines of the plate flat surface portions 110a and 130a, respectively. Further, the screw hole 112 screw-engaged with the base or object to be guided, not shown, and the screw hole 132 screw-engaged with the object to be guided or base, not shown, are formed on the diagonal lines perpendicular to the direction on which the access holes 113 and 133 are formed. The access hole 113 formed to the first plate 110 and the access hole 133 formed to the second plate 130 are arranged in the orthogonal direction in the assembled state of the first and second plates 110 and 130.

Furthermore, the intermediate member 120 sandwiched between the first plate 110 and the second plate 130 has a bored structure in which an opening 122 is formed at the central portion of an oval-shaped body. That is, with the guide table device of the second embodiment, the screw hole 112 on the first plate side can be observed from the access hole 133 on the second plate side, so that the mounting to the base or object to be guided, not shown, is realized by inserting a tool such as driver through the access hole 133 on the second plate side and screwing the fastening means such as bolt 150 with the screw hole 111 on the first plate side.

On the contrary, since the screw hole 132 on the second plate side can be observed from the access hole 1113 on the first plate side, the mounting to the object to be guided or base, not shown, is realized by inserting a tool such as driver through the access hole 113 on the first plate side and screwing the fastening means such as bolt 152 with the screw hole 131 on the second plate side.

Further, the shapes of the access holes 113 and 133 may employ a slot shape as shown in FIGS. 5 to 7, as well as other shapes such as circular-hole shape, elliptical hole shape and the like, as far as the access hole 113 and the screw hole 132, and the access hole 133 and the screw hole 112 are arranged so as to be overlapped with each other in a perpendicular direction when the assembling of the guide table device has been completed.

Furthermore, a head 150a of the bolt 150 screwed with the screw hole 112 of the first plate side and a head 152a of the bolt screwed with the screw hole 132 of the second plate side abut respectively against an inside wall surface of the opening 122 formed to the intermediate member 120 to thereby achieve the effect of prescribing the stroke ranges in the X- and θ-directions. That is, the heads 150a and 152a of the bolts 150 and 152 can achieve function as mechanical stopper. In addition, by optionally changing the relationship between the heads 150a, 152a and the opening 122, the stroke ranges in the X- and θ-directions can be optionally prescribed, and the movements, more than necessary, of the first plate 110 and the second plate 130 with respect to the intermediate member 120 can be prevented. Furthermore, this structure may contribute to the elimination of a member limiting the stroke ranges in the X- and θ-directions, and accordingly, the reduction of the structural member will contribute to the reduction of the manufacturing cost.

Figure 8:
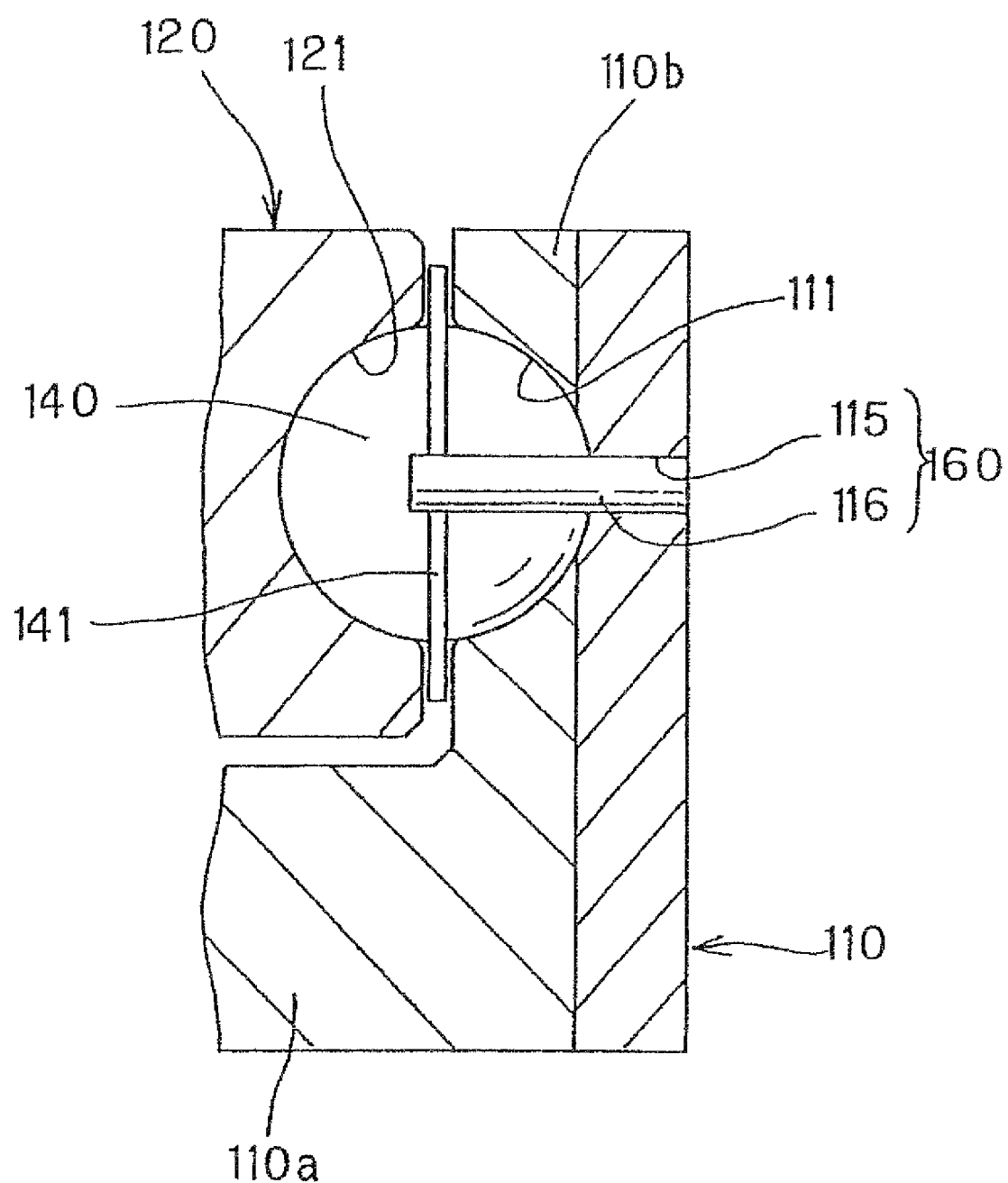
FIG. 8 is an enlarged sectional view of an essential portion for explaining a rolling member control means according to the second embodiment.

Still furthermore, it is possible for the first plate 110 and the second plate 130 to be provided with rolling member control means 160 to the stroke ends of the rolling member rolling grooves 111 and 131 of these plates for controlling the rolling motion of the ball. FIG. 8 is an enlarged view for explaining the rolling member control means 160 according to the second embodiment. Such rolling member control means 160 are respectively composed of spring pin insertion holes 115 and 135 formed to the stroke end portions of the rolling member rolling grooves 111 and 131 formed to the first plate 110 and the second plate 130, respectively, and spring pins 116 and 136 to be inserted into the spring pin insertion holes 115 and 135, respectively. A plurality of balls 140 maintaining their aligned state by being arranged in the cage 141 may be shifted and moved on one side in the rolling member rolling passage by the repeated rolling motions in the X- and θ-directions. In such occasion, if any control means for controlling the motion of the balls 140 is not located at the stroke end portions of the rolling member rolling grooves 111 and 131, there is a fear of shifting the balls on the end side of the rolling member rolling passage, and in an adverse case, the balls 140 may come off from the rolling member rolling passage and there may cause a case that any smooth rolling motion cannot be achieved. Then, the movement of the cage 141 is limited by the spring pins 116 and 136 disposed so as to project over the rolling member rolling grooves 111 and 131 to limit the range of the rolling motion of the balls 140 within the predetermined range.

Further, for the rolling motion control means 160 according to the second embodiment, from the view point of advantage of not receiving high load and requiring performance of a counter-side hole, the structure of the spring pins 116, 136 and the spring insertion holes 115, 135 is adopted. However, as to the rolling member control means, any type of means may be adopted as far as it controls the movement of the cage 141.

Furthermore, with respect to the stroke range of the guide table device according to the second embodiment, the stroke range will be prescribed by a structure satisfying a relationship of $\alpha < \beta$ supposing that $\alpha$ is a length of the side of the first plate 110 or the second plate 130 to which the rolling member rolling groove 111 or 131 is formed and $\beta$ is a length of the side thereof to which no rolling member rolling groove is formed (see FIG. 6). That is, a difference between values of $\alpha$ and $\beta$ corresponds to the stroke distance in the X- and θ-directions, and by changing this difference value, a guide table device having a desired stroke range can be designed.

Hereinabove, although the preferred embodiment of the present invention was mentioned, the technical scope of the present invention is not limited to the described range. The above-mentioned embodiment may be variously changed and modified. For example, in the described embodiment, the guide table device incorporated with the balls 140 was explained, but a structure in which rollers are utilized in place of the balls 140 may be adopted.

Furthermore, although the intermediate member 120 having approximately oval-shaped outer appearance was explained in the second embodiment, but any shape may be adopted as far as the intermediate member 120 is provided with four sides with the rolling member rolling grooves 121 opposing, with intervals, to the rolling member rolling grooves 111 of the first plate 110 and the rolling member rolling grooves 131 of the second plate 130, and is not limited to the member shown in FIG. 6 or so.

Still furthermore, in the guide table device of the second embodiment mentioned above, in order to make compact the entire structure of the device, the four rolling member rolling grooves 121 provided for the respective four sides of the intermediate member 120 are formed in the same plane. However, the structure of the intermediate member 120 may be changed in accordance with environment in which the guide table device is installed, and the rolling member rolling grooves 121a in the X-direction arranged so as to oppose to the rolling member rolling groove 111 of the first plate 110 and the rolling member rolling groove 121b in the θ-direction may be disposed separately in the vertical direction without disposing in the same plane of the intermediate member 120. Further, it is apparent that these changes or modifications may be included in the technical scope of the present invention as being clear from the scope of the appended claims.

Third Embodiment

Guide Table Device Capable of being Guided in X-, Y- and θ-Directions

Figure 9:
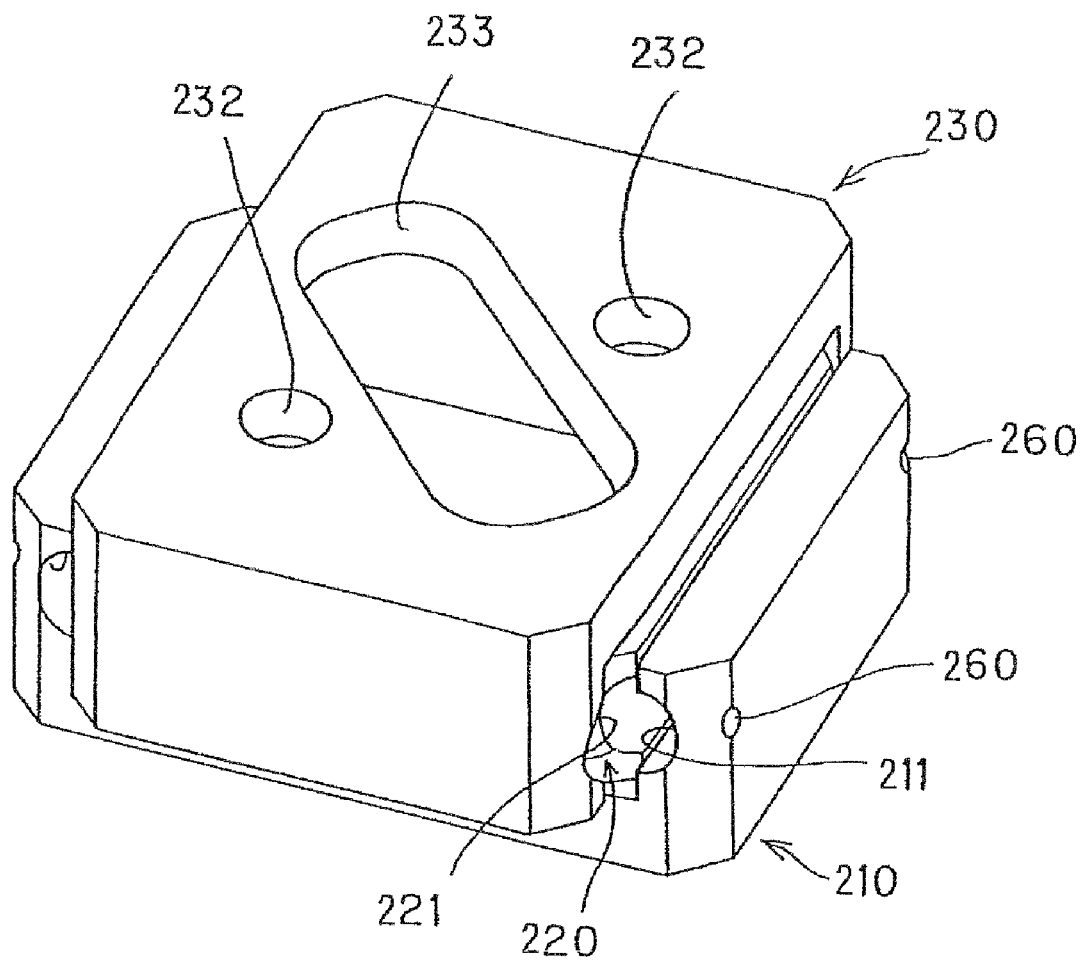
FIG. 9 is a perspective view showing an entire configuration of a guide table device according to a third embodiment of the present invention.
Figure 10:
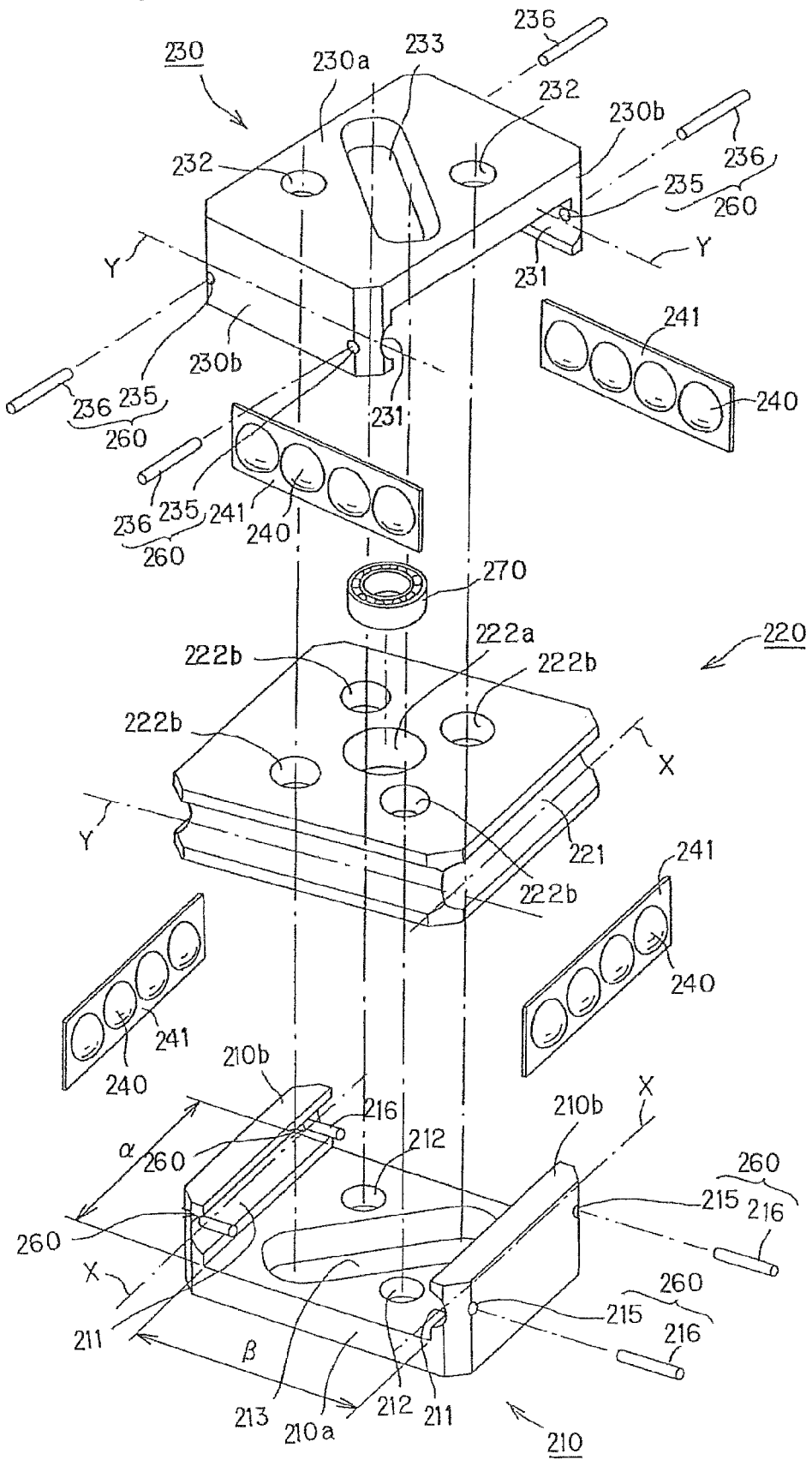
FIG. 10 is a developed perspective view of the guide table device of the third embodiment for showing structural members thereof.

FIG. 9 is a perspective view showing entire outer appearance of a guide table device according to the third embodiment of the present invention. FIG. 10 is a developed perspective view for explaining structural members of the guide table device of the third embodiment. The guide table device according to the third embodiment includes a lower-side plate 210, an intermediate member 220, an upper-side plate 230 and a plurality of balls 240 as essential elements.

The lower-side plate 210 is a member provided with a pair of rolling member rolling grooves 211 formed to the first direction (direction designated by character "X", which is called hereafter X-direction). The lower-side plate 210 includes a rectangular flat surface portion 210a and a pair of skirt portions 210b standing upward from two side portions extending in the X-direction of opposed two pairs of side portions. The flat surface portion 210a of the lower-side plate 210 is a member capable of being secured to a base such as bed or column as a positioning standard, and provided with screw holes 12 for securing. The paired skirt portions 210b are members provided with rolling member rolling grooves 211 formed in the opposing inside surfaces so as to receive rolling load of a plurality of balls 40 mentioned hereinlater.

The upper-side plate 230 is a member formed so as to have the same shape and size as those of the lower-side plate 210 and is used in a state of the lower-side plate being turned upside-down. That is, the upper-side plate 230 is a member provided with a pair of rolling member rolling grooves 231 formed in the second direction (i.e. direction shown by "Y", called Y-direction hereunder), and the specific structure thereof includes an upper-side plate flat surface portion 230a having a rectangular shape to which an object to be guided is fixed and two side portions opposing to this upper-side flat surface portion 230a, these two side portions constituting a pair of skirt portions 230b extending downward from two side portions extending in the perpendicular direction with respect to the two side portions to which the skirt portions 210b of the lower-side plate 210 are formed. Further, the rolling member rolling grooves 231 are also formed in the opposing inside surfaces of the paired skirt portions 230b so as to receive rolling load of the balls 240 as mentioned hereinafter. The fixing between the upper-side plate 230 and the object to be guided is performed by using screw holes 232 formed to the flat surface portion 230a of the upper-side plate.

The intermediate member 220 is a member disposed so as to be sandwiched between the lower-side plate 210 and the upper-side plate 230. This intermediate member 220 has a rectangular outer appearance and is formed with rolling member rolling grooves 221 in four side portions constituting an outer peripheral portion thereof. Two rolling member rolling grooves 221 formed in the X-direction in these four rolling member rolling grooves 221 are disposed so as to oppose to the paired rolling member rolling grooves 211 formed to the lower-side plate 210, and on the other hand, two rolling grooves 221 formed in the Y-direction in these four rolling member rolling grooves 221 are disposed so as to oppose to the paired rolling member rolling grooves 231 formed to the upper-side plate 230.

A pair of rolling member rolling passages extending in the X-direction are formed by the two rolling member rolling grooves 221 formed in the X-direction and the paired rolling member rolling grooves 211 formed to the lower-side plate 210. On the other hand, a pair of rolling member rolling passages extending in the Y-direction are formed by the two rolling member rolling grooves 221 formed in the Y-direction and the paired rolling member rolling grooves 231 formed to the upper-side plate 230. The balls 240 are freely rolling along these four rolling member rolling passages. These balls 240 are disposed between the four rolling member rolling passages via a cage 241, and by disposing the cage 241, the aligned rolling motion of the balls 240 can be always maintained.

Furthermore, the intermediate member 220 is formed with a plurality of openings at its rectangular central portion. Among these openings, an opening 222a for rotation positioned centrally is fitted with a bearing 270 so as to allow the guide table device to be entirely movable in the θ-direction. Further, as a member to be fitted into the opening 222a for rotation for realizing the θ-directional motion of the guide table device, a mechanical element capable of realizing the rotational motion such as cross roller ring in place of the bearing 270 may be employed. On the other hand, openings 222b for accessing formed around the opening 222a are for inserting fastening means for fixing the guide table device to the base or object to be guided.

In the above description, the basic structure of the guide table device according to the third embodiment of the present invention was explained, and in addition, as characteristic feature of the guide table device of this third embodiment, it will be pointed out that the four rolling member rolling grooves 221 provided for the four side portions of the intermediate member 220 are formed on the same plane. That is, in a conventional guide table device, the rolling member rolling grooves in the X-direction and those in the Y-direction are formed to the intermediate member in the different planes, and accordingly, in the conventional intermediate member, load in the guiding direction is not uniformly applied, and in addition, it was required for the intermediate member to have a thickness twice the width of the rolling member rolling groove. However, according to the intermediate member 220 of the third embodiment, since all the rolling member rolling grooves 221 are formed in the same plane, the load to be applied is made uniform, and it is satisfied for the intermediate member 220 to have a thickness equal to the width of the rolling member rolling groove, thus making compact the entire structure of the device.

Figure 11A:
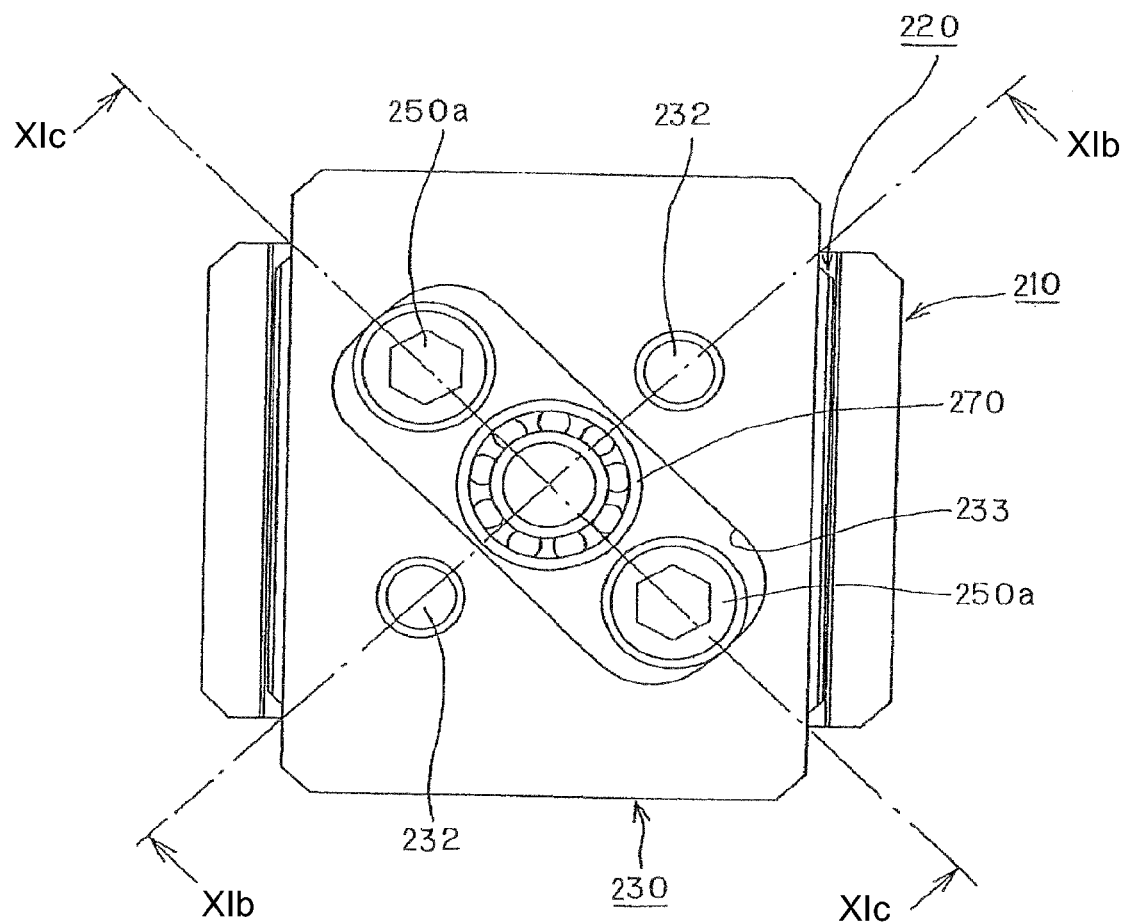
FIG. 11A is a plan view showing an upper outside portion of the guide table device of the third embodiment.
Figure 11B:
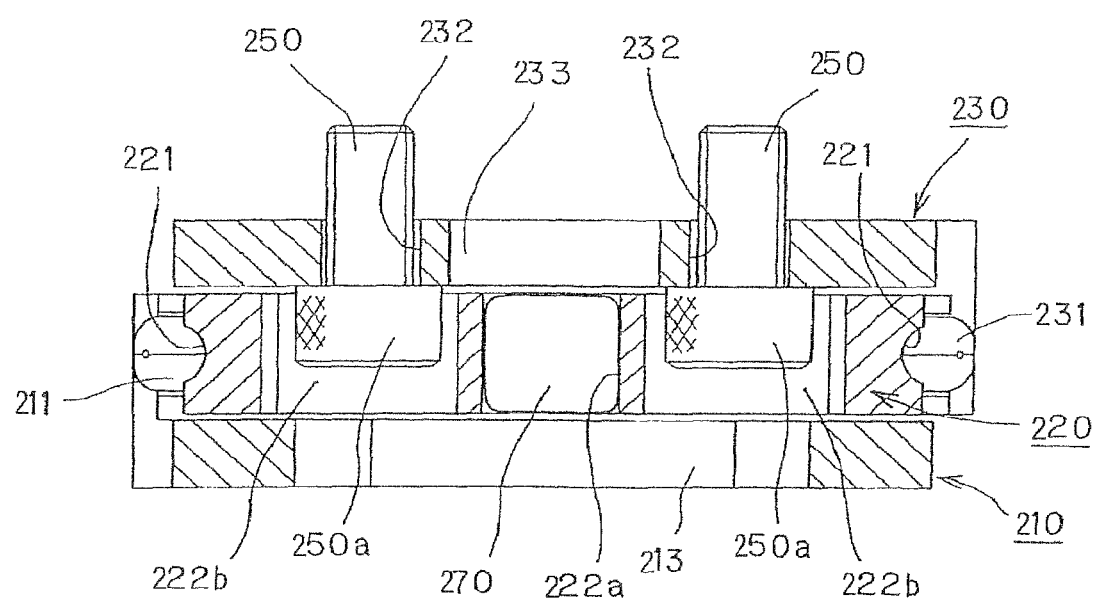
FIG. 11B shows an elevational side section taken along the line XIb-XIb in FIG. 11A.
Figure 11C:
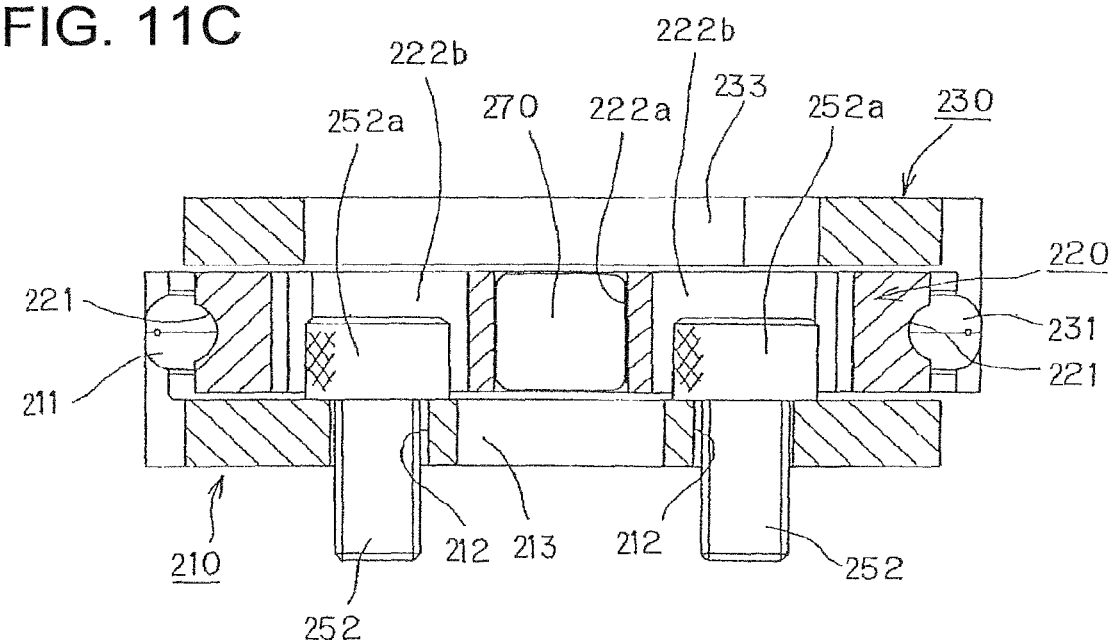
FIG. 11C shows an elevational side section taken along the line XIc-XIc in FIG. 11A.

Furthermore, the guide table device according to the third embodiment is provided with a further characteristic feature relating to a mounting structure to the base and the object to be guided. Such characteristic feature will be explained hereunder with reference to FIGS. 11A, 11B and 11C. Herein, FIG. 11A is an upper side view of an outer appearance of the device viewed from the upper side thereof, FIG. 11B is an elevational sectional side view of the XIb-XIb section in FIG. 11A, and FIG. 11C is an elevational sectional side view of the XIc-XIc section in FIG. 11A.

That is, as shown in FIG. 9 to FIG. 11C, access holes 213 and 233 are each formed to the lower-side plate 210 and the upper side plate 230 of the third embodiment in the diagonal direction of the flat surface portions 210a and 230a, respectively. In addition, the screw hole 212 to be screw-engaged with the base, not shown, and the screw hole 232 to be screw-engaged with the object to be guided, not shown, are formed on the diagonal line crossing perpendicularly to directions forming the access holes 213 and 233 on both sides thereof. The access hole 213 formed to the lower-side plate 210 and the access hole 233 formed to the upper-side plate 230 are arranged in directions crossing at right angles in the assembled state of the lower-side plate 210 and the upper-side plate 230.

Furthermore, the intermediate member 220 sandwiched in position between the lower-side plate 210 and the upper-side plate 230 is formed with the opening 222a for rotation at the rectangular central portion, as mentioned before. Since the bearing 270 is fitted into the opening 222a for rotation, the guide table device is enabled to be moved in the θ-direction. On the other hand, the openings 222b for accessing formed around the opening 222a for rotation are formed for the insertion of the fastening means. Therefore, according to the guide table device of the third embodiment, the screw hole 212 on the side of the lower-side plate 210 can be observed through the access hole 233 of the upper-side plate 230, so that the mounting of the device to the base, not shown, can be realized by inserting a tool such as driver through the access hole 233 of the upper-side plate side and screwing the fastening means such as bolt 250 to the screw hole 212 of the lower-side plate 210.

On the contrary, the screw hole 232 on the side of the upper-side plate 230 can be observed through the access hole 213 of the lower-side plate 210, so that the mounting of the object to be guided, not shown, can be realized by inserting a tool such as driver through the access hole 213 of the lower-side plate side and screwing a fastening member such as bolt 252 to the screw hole 232 of the upper-side plate 230.

Further, the access holes 213 and 233 may have various shapes, other than slot shape shown in FIGS. 9 to 11C, such as round-hole shape, elliptical-hole shape, or like, as far as there takes such positional relationship as that the access hole 213 is overlapped with the screw hole 232 and the access hole 233 is overlapped with the screw hole 212 respectively in the perpendicular direction at the time of completing the assembling working of the guide table device. Furthermore, as to the hole shape, various shapes may be adopted for the openings 222b for accessing, and any other shape may be adopted as far as the accessing between the access hole 233 of the upper-side plate 230 and the access hole 213 of the lower-side plate 210 and the screw hole 232 of the upper-side plate 230 can be realized.

Furthermore, a head 250a of the bolt 250 screwed with the screw hole 212 of the lower-side plate side and a head 252a of the bolt screwed with the screw hole 232 of the upper-side plate side respectively abut against an inside wall surface of the opening 222b for accessing formed to the intermediate member 220 to thereby achieve the effect of prescribing the stroke ranges in the X- and Y-directions. That is, the heads 250a and 252a of the bolts 250 and 252 can achieve function as mechanical stopper. In addition, by optionally changing the relationship between the heads 250a, 252a and the openings 222b for accessing, the stroke ranges in the X- and Y-directions can be optionally prescribed, and the movements, more than necessary, of the lower-side plate 210 and the upper-side plate 230 with respect to the intermediate member 220 can be prevented. Furthermore, this structure may contribute to the elimination of a member limiting the stroke ranges in the X- and Y-directions, and accordingly, the reduction of the structural member will contribute to the reduction of the manufacturing cost.

Figure 12:
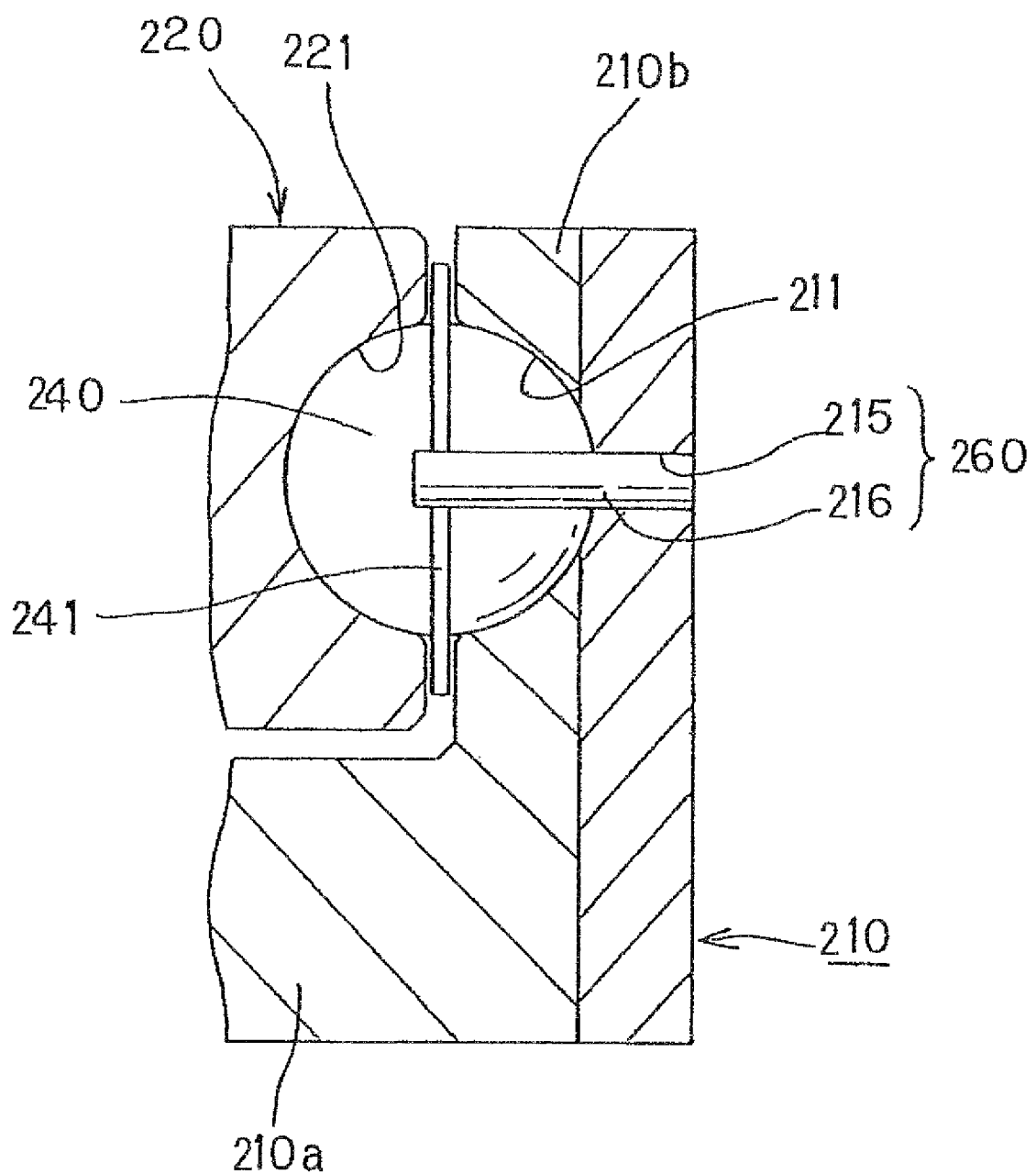
FIG. 12 is an enlarged sectional view of an essential portion for explaining a rolling member control means according to the third embodiment.

Still furthermore, it is possible for the lower-side plate 210 and the upper-side plate 230 to be provided with rolling member control means 260 to the stroke ends of the rolling member rolling grooves 211, 231 of these plates for controlling the rolling motion of the ball. FIG. 12 is an enlarged view for explaining the rolling member control means 260 according to the third embodiment. Such rolling member control means 260 are respectively composed of spring pin insertion holes 215 and 235 formed to the stroke end portions of the rolling member rolling grooves 211 and 231 formed to the lower-side plate 210 and the upper-side plate 230, respectively, and spring pins 216 and 236 to be inserted into the spring pin insertion holes 215 and 235, respectively. A plurality of balls 240 maintaining their aligned state by being arranged in the cage 241 may be shifted and moved on one side in the rolling member rolling passage by the repeated rolling motions in the X- and Y-directions. In such occasion, if any control means for controlling the motion of the balls 240 is not located at the stroke end portions of the rolling member rolling grooves 211 and 231, there is a fear of shifting the balls on the end side of the rolling member rolling passage, and in an adverse case, the balls 240 may come off from the rolling member rolling passage and there may cause a case that any smooth rolling motion cannot be achieved. Then, the movement of the cage 241 is limited by the spring pins 216 and 236 disposed so as to project over the rolling member rolling grooves 211 and 231 so as to limit the range of the rolling motion of the balls 240 within the predetermined range.

Further, for the rolling motion control means 260 according to the third embodiment, from the view point of advantage of not receiving high load and requiring performance of a counter-side hole, the structure of the spring pins 216, 236 and the spring insertion holes 215, 235 is adopted. However, as to the rolling member control means, any type of means may be adopted as far as it controls the movement of the cage 241.

Furthermore, with respect to the stroke range of the guide table device according to the third embodiment, the stroke range will be prescribed by a structure satisfying a relationship of $\alpha<\beta$ supposing that $\alpha$ is a length of the side of the lower-side plate 210 or the upper-side plate 230 to which the rolling member rolling groove 211 or 231 is formed and $\beta$ is a length of the side thereof to which no rolling member rolling groove is formed (see FIG. 10). That is, a difference between values of $\alpha$ and $\beta$ corresponds to the stroke distance in the X- and Y-directions, and by changing this difference value, a guide table device having a desired stroke range can be designed.

Hereinabove, although the preferred embodiment of the present invention was mentioned, the technical scope of the present invention is not limited to the described range. The above-mentioned embodiment may be variously changed and modified. For example, in the described embodiment, the guide table device incorporated with the balls 240 was explained, but a structure in which rollers are utilized in place of the balls 240 may be adopted.

Furthermore, as the intermediate member 220 having rectangular outer appearance, the square intermediate member 220 was explained with the drawings in the third embodiment, but a rectangular shape or rhombic shape may be adopted. That is, the term "rectangular" mentioned in these papers is defined so as to include the square shape, rectangular shape and rhombic shape.

Furthermore, in order to realize the θ-directional motion of the guide table device, in the third embodiment, the structure provided with the bearing 270 for the intermediate member 220, and for example, in a case of requiring 360 degree's rotation, a circular-arc-shaped opening may be partially formed to the intermediate member 220 so as to realize a rotational motion in a limited range. That is, the opening to be formed to the intermediate member 220 may have at least a portion having a circular-arc shape. It may be clear from the description of the appended claims that an embodiment including such modification or change is included in the technical scope of the present invention.

The invention claimed is:

1. A guide table device comprising:
a lower-side plate provided with a pair of rolling member rolling grooves formed in a first direction;
an upper-side plate provided with a pair of rolling member rolling grooves formed in a second direction;
an intermediate member having a rectangular configuration having four side portions in which four rolling member rolling grooves are respectively formed so as to oppose to the paired rolling member rolling grooves formed to the lower-side plate and the paired rolling member rolling grooves formed to the upper-side plate, respectively; and
a plurality of balls arranged in four rolling member rolling passages respectively formed by the lower-side plate, the upper-side plate and the intermediate member,
wherein the rolling member rolling grooves formed to the four side portions of the intermediate member are formed on a same plane.

2. The guide table device according to claim 1, wherein the lower-side plate and the upper-side plate have substantially same shape and size.

3. The guide table device according to claim 1, wherein a plurality of balls are arranged between the four rolling member rolling passages through a cage.

4. The guide table device according to claim 1, wherein the lower-side plate and the upper-side plate are each formed with at least one access hole formed to a plate flat surface portion and one screw hole formed to a plate flat surface portion, and the intermediate member has a bored structure forming an opening at a central portion of a rectangular surface portion, and wherein a fastening member is screw-engaged with the screw hole formed to the upper-side plate through the access hole formed to the lower-side plate as viewed from the lower-side plate side, and a fastening member is screw-engaged with the screw hole formed to the lower-side plate through the access hole formed to the upper-side plate as viewed from the upper-side plate side.

5. The guide table device according to claim 1, wherein the lower-side plate and the upper-side plate are respectively provided with rolling member control members for controlling rolling motion of the rolling member at stroke end portions of the rolling member rolling grooves formed to the lower-side plate and the upper-side plate.

6. The guide table device according to claim 5, wherein the rolling member control member includes a spring pin insertion hole formed to a stroke end portion of the rolling member rolling groove formed to each of the lower-side plate and the upper-side plate, and a spring pin disposed to be inserted into the spring pin insertion hole.

7. The guide table device according to claim 1, wherein the lower-side plate and the upper side plate have a relationship of $\alpha<\beta$, in which $\alpha$ is a length of a side to which the rolling member rolling groove is formed and $\beta$ is a length of a side to which the rolling member rolling groove is not formed.

8. A guide table device comprising:
a lower-side plate provided with a skirt portions standing up from opposing two side portions of a rectangular flat surface portion of the lower-side plate to be fixed to a base, the skirt portions having opposing inside surfaces in which rolling member rolling grooves are respectively formed;
an upper-side plate provided with a skirt portions extending downward from opposing two side portions in a perpendicular direction with respect to two side portions to which the skirt portions of the lower-side plate are formed, the skirt portions having opposing inside surfaces in which rolling member rolling grooves are respectively formed;

an intermediate member having a rectangular configuration having four side portions in which four rolling member rolling grooves are respectively formed so as to oppose to the paired rolling member rolling grooves formed to the lower-side plate and the paired rolling member rolling grooves formed to the upper-side plate, respectively; and a plurality of balls arranged in four rolling member rolling passages respectively formed by the lower-side plate, the upper-side plate and the intermediate member, wherein the rolling member rolling grooves formed to the four side portions of the intermediate member are formed on a same plane.

9. The guide table device according to claim 8, wherein a plurality of balls are arranged between the four rolling member rolling passages through a cage.

10. A guide table device comprising:

a first plate provided with a pair of rolling member rolling grooves formed in the linear direction;

a second plate provided with a pair of rolling member rolling grooves each having a curvature, the paired rolling member rolling grooves being disposed with opposing curved recessed portions;

an intermediate member having substantially an oval configuration having four side portions in which four rolling member rolling grooves are formed so as to oppose to the paired rolling member rolling grooves formed to the first plate and the paired rolling member rolling grooves formed to the second plate with equal spaces, respectively; and a plurality of rolling members disposed to be rollable in four rolling member rolling passages formed by the first plate, the second plate and the intermediate member.

11. The guide table device according to claim 10, wherein the first plate is provided with a pair of linear skirt portions formed to two linear side portions opposing to a plate flat surface portion of the first plate fixed to a base or an object to be guided and a the rolling member rolling grooves formed in the inside surfaces opposing to the linear skirt portions, and the second plate is provided with a pair of curved skirt portions formed to two side portions having curvature opposing to an oval-shaped plate flat surface portions of the second plate fixed to the object to be guided or the base, and the rolling member rolling grooves are formed to the inside surfaces opposing to the curved skirt portions, respectively.

12. The guide table device according to claim 11, wherein the plural rolling members are disposed between the four rolling member rolling passages through a cage.

13. The guide table device according to claim 10, wherein the plural rolling members are disposed between the four rolling member rolling passages through a cage.

14. The guide table device according to claim 10, wherein the first plate and the second plate are each formed with at least one access hole formed to a plate flat surface portion and one screw hole formed to a plate flat surface portion, and the intermediate member has a bored structure forming an opening at an oval-shaped central portion of the surface portion, and wherein a fastening member is screw-engaged with the screw hole formed to the second plate through the access hole formed to the first plate as viewed from the first plate side, and a fastening member is screw-engaged with the screw hole formed to the first plate through the access hole formed to the second plate as viewed from the second plate side.

15. The guide table device according to claim 10, wherein the first plate and the second plate are respectively provided with rolling member control members for controlling rolling motion of the rolling member at stroke end portions of the rolling member rolling grooves formed to the first plate and the second plate.

16. The guide table device according to claim 15, wherein the rolling member control member includes a spring pin insertion hole formed to a stroke end portion of the rolling member rolling groove formed to each of the first plate and the second plate, and a spring pin disposed to be inserted into the spring pin insertion hole.

17. The guide table device according to claim 10, wherein the first plate and the second plate have a relationship of $\alpha<\beta$, in which $\alpha$ is a length of a side to which the rolling member rolling groove is formed and $\beta$ is a length of a side to which the rolling member rolling groove is not formed.

18. The guide table device according to claim 10, wherein the four rolling member rolling grooves formed in the four side portions of the intermediate member are disposed on a same plane.

19. A guide table device comprising:

a lower-side plate provided with a pair of rolling member rolling grooves extending in a first direction;

an upper-side plate provided with a pair of rolling member rolling grooves extending in a second direction;

an intermediate member having a rectangular configuration provided with four rolling member rolling grooves formed to four side portions of the intermediate member disposed so as to be opposed to a pair of rolling member rolling grooves of the lower-side plate and a pair of rolling member rolling grooves of the upper-side plate, respectively; and a plurality of rolling members disposed to be rollable in four rolling member rolling passages formed by the lower-side plate, the upper-side plate and the intermediate member, wherein the lower-side plate is provided with lower side skirt portions standing up from opposing two side portions of a rectangular flat surface portion of the lower-side plate to be fixed to a base, the skirt portions having opposing inside surfaces in which rolling member rolling grooves are respectively formed; the upper-side plate is provided with skirt portions extending downward from opposing two side portions in a perpendicular direction with respect to two side portions to which the skirt portions of the lower-side plate are formed, the skirt portions having opposing inside surfaces in which rolling member rolling grooves are respectively formed; the intermediate member has four rolling member rolling grooves formed to the four side portions on a same plane, and an opening is bored at a rectangular central portion thereof; and the opening has at least a circular-arc portion so that the guide table device is entirely rotationally movable with a central point of the circular-arc shape being a center of rotation.

20. The guide table device according to claim 19, wherein the opening has a round shape and a rotational bearing or cross roller bearing is disposed in the circular opening so that the guide table device is entirely rotationally movable.

* * * * *